United States Patent
Liu et al.

(10) Patent No.: US 9,858,683 B2
(45) Date of Patent: Jan. 2, 2018

(54) METHOD AND SYSTEM OF PLANAR SURFACE DETECTION OBJECTS IN 3D SPACE GENERATED FROM CAPTURED IMAGES FOR IMAGE PROCESSING

(71) Applicant: INTEL CORPORATION, Santa Clara, CA (US)

(72) Inventors: Haowei Liu, Santa Clara, CA (US); Hon Pong Ho, Santa Clara, CA (US); Mohamed Selim Ben Himane, Santa Clara, CA (US)

(73) Assignee: Intel Corporation, Santa Clara, CA (US)

(*) Notice: Subject to any disclaimer, the term of this patent is extended or adjusted under 35 U.S.C. 154(b) by 161 days.

(21) Appl. No.: 14/819,217

(22) Filed: Aug. 5, 2015

(65) Prior Publication Data
US 2017/0039731 A1   Feb. 9, 2017

(51) Int. Cl.
| | |
|---|---|
| G06T 7/60 | (2017.01) |
| H04N 13/02 | (2006.01) |
| H04N 13/00 | (2006.01) |
| G06T 7/00 | (2017.01) |
| G06K 9/00 | (2006.01) |
| G06K 9/36 | (2006.01) |

(52) U.S. Cl.
CPC ............ *G06T 7/60* (2013.01); *G06K 9/00201* (2013.01); *G06T 7/0042* (2013.01); *G06T 7/0075* (2013.01); *H04N 13/0022* (2013.01); *H04N 13/0271* (2013.01); *G06K 2009/363* (2013.01); *G06T 2200/04* (2013.01); *H04N 2013/0081* (2013.01)

(58) Field of Classification Search
None
See application file for complete search history.

(56) References Cited

U.S. PATENT DOCUMENTS

| | | | |
|---|---|---|---|
| 9,424,650 B2* | 8/2016 | van Baar | G06T 7/0075 |
| 9,600,736 B2* | 3/2017 | Kropf | G06K 9/46 |
| 2010/0315412 A1 | 12/2010 | Sinha et al. | |
| 2013/0070060 A1* | 3/2013 | Chatterjee | H04N 5/2258 348/47 |
| 2013/0188861 A1 | 7/2013 | Rhee et al. | |
| 2014/0363073 A1 | 12/2014 | Shirakyan et al. | |
| 2014/0368615 A1* | 12/2014 | van Baar | G06T 7/0075 348/48 |
| 2015/0154467 A1 | 6/2015 | Feng et al. | |
| 2017/0039731 A1* | 2/2017 | Liu | G06T 7/60 |

OTHER PUBLICATIONS

Borrmann et al., "The 3D Hough Transform for Plane Detection in Point Clouds: A Review and a New Accumulator Design," 3D Res. 2, 02(2011)3, 13 pages.

Holz et al., "Real-Time Plane Segmentation Using RGB-D Cameras," In Proceedings of 15th RoboCup International Symposium, Istanbul, 2011. In: RoboCup 2011: Robot Soccer World Cup XV, LNCS 7416, pp. 306-317, Springer 2012.

(Continued)

*Primary Examiner* — Tahmina Ansari
(74) *Attorney, Agent, or Firm* — Green, Howard & Mughal LLP.

(57) ABSTRACT

A system, article, and method of planar surface detection for image processing.

25 Claims, 10 Drawing Sheets

(56) References Cited

OTHER PUBLICATIONS

Gonzalez et al., Digital Image Processing, 3rd Edition, Aug. 31, 2007, pp. 652-657.
International Search Report and Written Opinion for PCT/US2016/040376, dated Oct. 26, 2016, 14 pages.
Besl, Paul J. et al., "A Method for Registration of 3-D Shapes", IEEE Transactions on Pattern Analysis and Machine Intelligence, vol. 14, No. 2, Feb. 1992.
Newcombe, Richard A. et al., "KinectFusion: Real-Time Dense Surface Mapping and Tracking", Proceedings of the 2011 10th IEEE International Symposium on Mixed and Augmented Reality (ISMAR'11), pp. 127-136, Oct. 26, 2011, IEEE Computer Society, Washington DC, USA.
Ray, Harvey et al., "Ray Casting Architectures for Volume Visualization", IEEE Transactions on Transactions on Visualization & Computer Graphics, vol. 5, No. 3, Jul.-Sep. 1999.

* cited by examiner

```
┌─────────────────────────────────────────────────┐
│ OBTAIN DEPTH IMAGE DATA HAVING THREE DIMENSIONAL │
│ COORDINATES FOR MULTIPLE PIXELS WHEREIN EACH PIXEL│
│         FORMS A POINT IN A DEPTH IMAGE           │
│                       302                        │
└─────────────────────────────────────────────────┘
                         ↓
┌─────────────────────────────────────────────────┐
│         SELECT SAMPLE POINTS IN THE DEPTH IMAGE  │
│                       304                        │
└─────────────────────────────────────────────────┘
                         ↓
┌─────────────────────────────────────────────────┐
│  GENERATE A PLANE HYPOTHESIS FOR EACH ONE OF MULTIPLE │
│  INDIVIDUAL SAMPLE POINTS BY USING MULTIPLE POINTS    │
│                       306                        │
└─────────────────────────────────────────────────┘
                         ↓
┌─────────────────────────────────────────────────┐
│ PERFORM VOTING TO DETERMINE WHICH PIXELS HAVE    │
│ CONTENT ON THE IMAGE THAT IS LIKELY TO EXIST ON AT LEAST │
│           ONE OF THE PLANE HYPOTHESES            │
│                       308                        │
└─────────────────────────────────────────────────┘
```

METHOD AND SYSTEM OF PLANAR SURFACE DETECTION OBJECTS IN 3D SPACE GENERATED FROM CAPTURED IMAGES FOR IMAGE PROCESSING

BACKGROUND

Many image capture devices have 3D or depth sensing cameras that can form a 3D space of a scene, measure the distance from the camera to an object in a scene, and/or provide dimensions of an object in a scene. This is typically performed by using a stereoscopic system with an array of cameras or sensors on a single device and that uses triangulation algorithms to determine 3D space coordinates for points in a scene to form a depth map or depth image for the scene. Other methods to generate a depth image, such as from a single camera, also are known. Often it is useful to augment the captured image or scene by placing external images or virtual objects into the scene and positioned in a realistic manner, such as placing a drawing on a picture of a wall, or placing furniture in a picture of a room. When performed correctly, the objects are in a realistic perspective that matches the perspective in the picture so that the scene with the inserted objects looks realistic to a person viewing the picture. To accomplish these functions, the conventional systems search for planar surfaces, and warp the shape of the virtual objects to place the virtual objects on, or relative to, the planar surfaces. This planar surface searching task, however, is often based on an iterative process that is extremely computationally heavy, resulting in a very low frame rate so that such a process is impractical for many devices.

DESCRIPTION OF THE FIGURES

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIG. 3 is a flow chart showing a planar surface detection process in accordance with the implementations herein;

DETAILED DESCRIPTION

Figure 1:
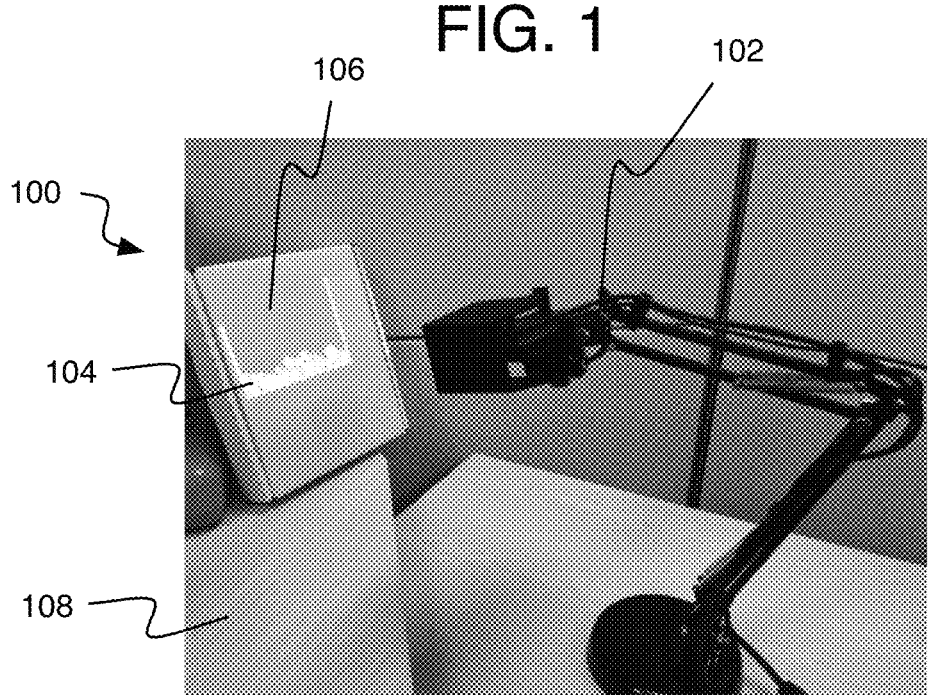
FIG. 1 is an illustration of a virtual object placed onto a real world surface.

One or more implementations are now described with reference to the enclosed figures. While specific configurations and arrangements are discussed, it should be understood that this is performed for illustrative purposes only. Persons skilled in the relevant art will recognize that other configurations and arrangements may be employed without departing from the spirit and scope of the description. It will be apparent to those skilled in the relevant art that techniques and/or arrangements described herein also may be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as imaging devices, digital cameras, smart phones, webcams, video game panels or consoles, set top boxes, tablets with multiple cameras, and so forth, may implement the techniques and/or arrangements described herein. Further, while the following description may set forth numerous specific details such as logic implementations, types and interrelationships of system components, logic partitioning/integration choices, and so forth, claimed subject matter may be practiced without such specific details. In other instances, some material such as, for example, control structures and full software instruction sequences, may not be shown in detail in order not to obscure the material disclosed herein. The material disclosed herein may be implemented in hardware, firmware, software, or any combination thereof.

The material disclosed herein may also be implemented as instructions stored on a machine-readable medium or memory, which may be read and executed by one or more processors. A machine-readable medium may include any medium and/or mechanism for storing or transmitting information in a form readable by a machine (for example, a computing device). For example, a machine-readable medium may include read-only memory (ROM); random access memory (RAM); magnetic disk storage media; optical storage media; flash memory devices; electrical, optical, acoustical or other forms of propagated signals (e.g., carrier waves, infrared signals, digital signals, and so forth), and others. In another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

References in the specification to "one implementation", "an implementation", "an example implementation", and so forth, indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described herein.

Systems, articles, and methods to provide planar surface detection for image processing.

As mentioned above, conventional stereo cameras or other depth measurement systems are available that provide real-time color and depth information in a scene. Specifically, for stereo systems for example, two cameras are used to capture an image of the same scene from different angles. Triangulation then may be used to determine the depth from the cameras to an object in the scene. This may result in a depth map or depth image with (x, y, z) coordinates for each pixel.

Figure 2:
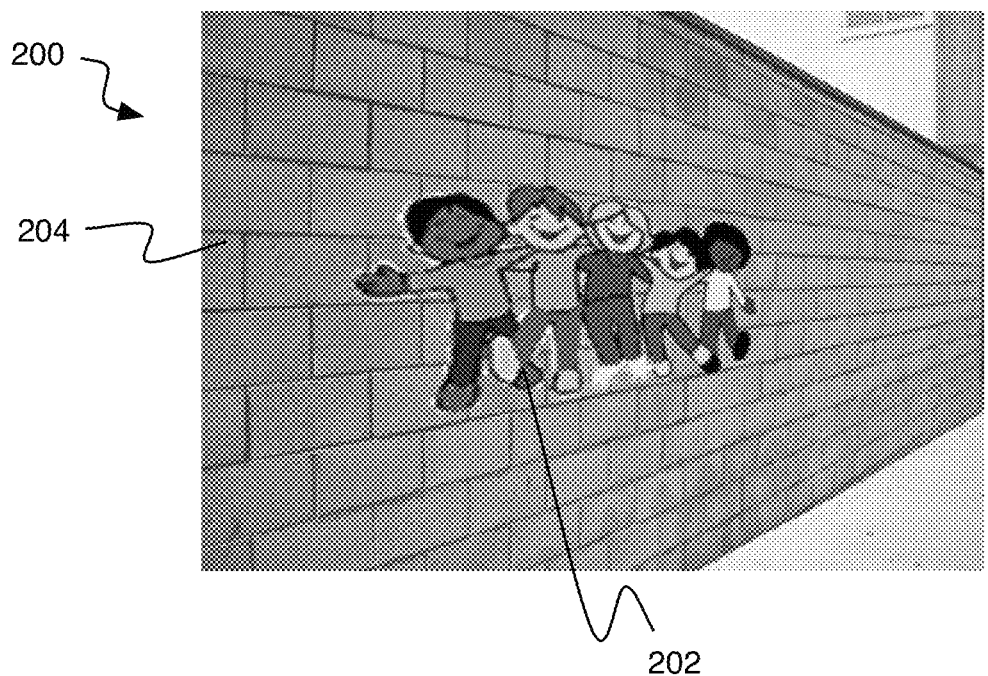
FIG. 2 is another illustration of a virtual object placed onto a real world surface.

Referring to FIGS. 1-2, as an enhancement to the depth camera, a 3D system may find planar surfaces in the scene for various real time augmented reality applications. With such capability, virtual objects can be inserted seamlessly into the raw images. For example, a scene 100 (FIG. 1) has a projector 102 that projects a virtual object such as a gaming interface 104 onto a flat or planar surface 106 in the scene 108. The virtual object 104 is auto-adjusted according to the planar surface normal. Likewise, a 2D children's picture (202) is the virtual object inserted into an image 200 of a wall 204 by automatically transforming the perspective, or warping, the virtual object 202 to match the perspective of the planar wall 204.

By the conventional methods, detecting planar surfaces in depth data is mostly performed with either Hough Transform or Random Sample Consensus (RANSAC). The problem with these schemes is that they blindly iterate through the parameter space to find the planar surfaces that fit a 3D point cloud that forms the image, and hence the frame rate that is achieved can be extremely low (as low as <1 fps). This problem occurs because these systems operate in the parameter space while using the algebraic planar equation to determine a plane hypothesis for each point in the image (it should be noted that the term plane and plane hypothesis may be used interchangeably herein).

More specifically, each plane hypothesis is set by the planar equation:

$$a_h x_p + b_h y_p + c_h z_p + d_h = 0 \quad (1)$$

where ($x_p$, $y_p$, $z_p$) are the coordinates in the units (such as meters) of the content (or object or feature point) in the image and for every pixel or point in the image. To perform the conventional methods, the parameters for the equation (1) $h(a_h, b_h, c_h, d_h)$ is first converted into a Polar coordinate system representation: $h(a_h, b_h, c_h, d_h) = h(\cos\theta \sin\varphi, \sin\theta \sin\varphi, \cos\varphi, d_h)$, the parameter space ($\theta$, $\varphi$, $d_h$) is quantized, and the system effectively searches the parameter space for every possible combination of ($\theta$, $\varphi$, $d_h$), where $\theta$ is the angle of the normal vector ($a_h$, $b_h$, $c_h$) on the xy plane and $\varphi$ is the angle between the xy plane and the normal vector ($a_h$, $b_h$, $c_h$) in z direction. $\theta$ ranges from 0 to 360 degrees and $\varphi$ ranges from 0 to 180 degrees. Assuming the target application operates within a 5 meter range, and hence $d_h$ ranges from 0 to 5, 5 degrees is used for both $\theta$ and $\varphi$, then 0.05 meters for $d_h$ to have reasonable plane detection results. The final plane hypotheses are those that have sufficient pixel support. A pixel $p(x_p, y_p, z_p)$ supports a plane hypothesis: $h(a_h, b_h, c_h, d_h)$ if:

$$|a_h x_p + b_h y_p + c_h z_p + d_h| <= \delta, \quad (2)$$

where $\delta$ is a threshold to account for depth noise. Since {$a_h$, $b_h$, $c_h$, $d_h$} are floating point numbers, in practice, the parameter space is quantized with large bin size to reduce the search time, but even with quantization, the number of hypotheses is still large. For the above example, the conventional system needs to consider a total number of 72*36*100~260,000 possible combinations. For large images, e.g. (1334×750) or (1920×1080) pixels on the screen of a smaller device such as a smartphone, the large number of hypotheses coupled with high resolution images induces a very large computational load, resulting in inefficiency and slow frame rate. Details about the conventional Hough transform based approach can be found in R. C. Gonzalez et al., Digital Image Processing, 3rd Edition, pp. 697-700, Aug. 31, 2007.

To resolve these issues, the present method and system generates plane hypotheses by directly sampling the depth image rather than testing a range of possible values for the parameters (a, b, c, d) (which may be in polar form as described above) in the planar equation expression ax+by+cz+d for a single image point to determine the values of (a, b, c, d). Particularly, the method draws a set of hypothesis planes from the depth image by using spaced sample points on the image to form each hypothesis plane instead of being drawn blindly from the parameter space by testing a range of possible parameter values separately with every pixel to form plane hypotheses. This alone may reduce the number of hypotheses from at least several thousands to only around a few hundred with VGA (640*480) or QVGA (320*240) resolutions, enabling a very significant increase in frame rate, with much greater increases with higher resolution screens such as (1334×750) or (1920×1080).

The disclosed method and system also may use gravity-sensing sensor data to further reduce the number of hypotheses when users are only interested in planar surfaces of certain orientations (e.g. planes parallel or perpendicular to the ground depicting floors or walls). Planes of the wrong orientation may be dropped.

Otherwise, voting to determine whether each pixel belongs on a plane hypothesis not only includes determining whether a particular plane hypothesis using the pixel coordinates is equal to a certain threshold, but also tests to determine if the normal of the local surface near the pixel being used for voting is similar to the normal of the plane hypothesis, which at least provides better accuracy near plane boundaries. The method and system also may include eliminating one of two or more overlapping planes, and also, using region erosion and region growth techniques that recover unfit 3D vertices (and that appear to be holes or gaps in the plane) and that occur due to depth noise. The output of the algorithm is a list of plane equations along with an index map that labels each pixel as belonging to a certain plane hypothesis. The equations and index map can then be used for warping virtual objects to match the perspective of one of the detected planes in the image to place the virtual object on the plane.

Thus, guided by the given depth image, the present method samples the plane parameter space in an educated manner, and hence achieves a much higher frame rate (about 300 fps at video graphics array (VGA) depth) than the conventional methods. Since the present method also includes gravity-sensitive (such as an inertial measurement unit (IMU)) sensor data incorporation to further improve the frame rate when only planes of specific orientation (e.g. horizontal planes, such as ground) are needed, a different voting scheme that takes into account local geometry to improve the accuracy at plane boundaries, and a color-based refinement stage to fill holes and unfit areas, this results in a method and system of plane detection that may be hundreds of times faster than the known methods. The current method also produces a smoother boundary of the planes with the incorporation of the local geometry and color information versus that of the known methods.

Referring to FIG. 3, process 300 is provided for a method and system of planar surface detection for image processing. In the illustrated implementation, process 300 may include one or more operations, functions or actions 302 to 308 numbered evenly. By way of non-limiting example, process 300 may be described herein with reference to example image capture processing system 1000 of FIG. 10 respectively, and where relevant.

Process 300 may include "obtain depth image data having three dimensional coordinates for multiple pixels wherein each pixel forms a point in a depth image" 302. As explained in detail with process 400, this may include pre-processing raw image data, and then applying 3D processing which may include rectification, feature matching, and final depth calculations to generate a depth map or the depth image. The depth image represents a 3D space that may have been formed from multiple images of the same scene whether from one camera or multiple cameras, and whether taken at the same time instant or different times (typically when the scene does not move). The result is a depth image where the content of each pixel point has three dimensional (x, y, z) coordinates.

The process 300 also may include "select sample points in the depth image" 304. This may include selecting sample points that are spaced from each other, and in one form, in horizontal and vertical arrays although many other arrangements are possible. The spacing may depend, at least in part, on the focal length of the camera(s) as well as either a minimum depth a camera providing the image can sense or an average depth detected in the image, as described in greater detail below. The spacing is selected based on the needs of a user's application where larger spacing is used for images that capture a far range such as with photography, and a smaller spacing for images that capture a close range or close-up view, as with augmented reality applications. Many other details are provided below.

Process 300 then may include "generate a plane hypothesis for each one of multiple individual sample points by using multiple points" 306. Particularly, this operation may include using three sample points to form a plane hypothesis. Instead of three sample points, it is contemplated that a single sample point and two other points on the depth image could be used to form the plane hypotheses, but the samples below allow are relate to three sample points. This may include forming triangular areas that are parts of a plane hypothesis and formed with the sample points so that a main sample point is at the upper left corner of the triangle and the next right sample point and the next lower (or downward) sample point relative to the main sample point form two other corners of the triangular area. The three sample points are then used to determine parameters for a planar equation associated with the main sample point. In one example, two vectors are formed from the three sample points, and the cross-product or normal is determined to set the parameters of the planar equation. The parameter values are then used with the coordinates of the main sample point in the planar equation to set the plane hypothesis. The details are provided below.

The next stage may be a verification stage which may or may not include plane hypothesis elimination due to the orientation of the plane, but at least includes voting. The orientation elimination includes keeping only those plane hypotheses with the same or similar orientation as the orientation desired by the user's application. Thus, the application may request a vertical or horizontal plane (for a wall or floor for example), and the present method may use gravitational sensors used at the time the images were captured to determine the orientation of the plane hypotheses. The plane hypotheses that do not have an orientation that matches the desired orientation may be eliminated or dropped. More details are explained below.

Otherwise, the process 300 may include "perform voting to determine which pixels have content on the image that is likely to exist on at least one of the plane hypotheses" 308. Voting may be performed, by one example, by plugging in each or multiple pixel point coordinates into the planar equation of the plane hypothesis one by one to determine if the result is close to zero or at least lower than a threshold or some other criteria. This is not the only test, however, and the normal of the plane hypothesis, already determined when forming the plane hypothesis, may be compared to a local surface area normal of the point on the image that is voting. If the normals are the same or similar, and the point coordinates satisfy the planar equation, then the point supports or votes for that plane hypothesis. An index map then may be formed that lists the plane hypotheses, and lists the points that support each plane hypothesis.

Other operations also may be performed to further eliminate plane hypotheses and refine the quality of the planes before providing a final index map of the plane hypotheses. This may include suppression of the non-largest planes when planes overlap, and color-based hole and gap filling using region erosion and region growth as described in detail below.

Figure 4A:
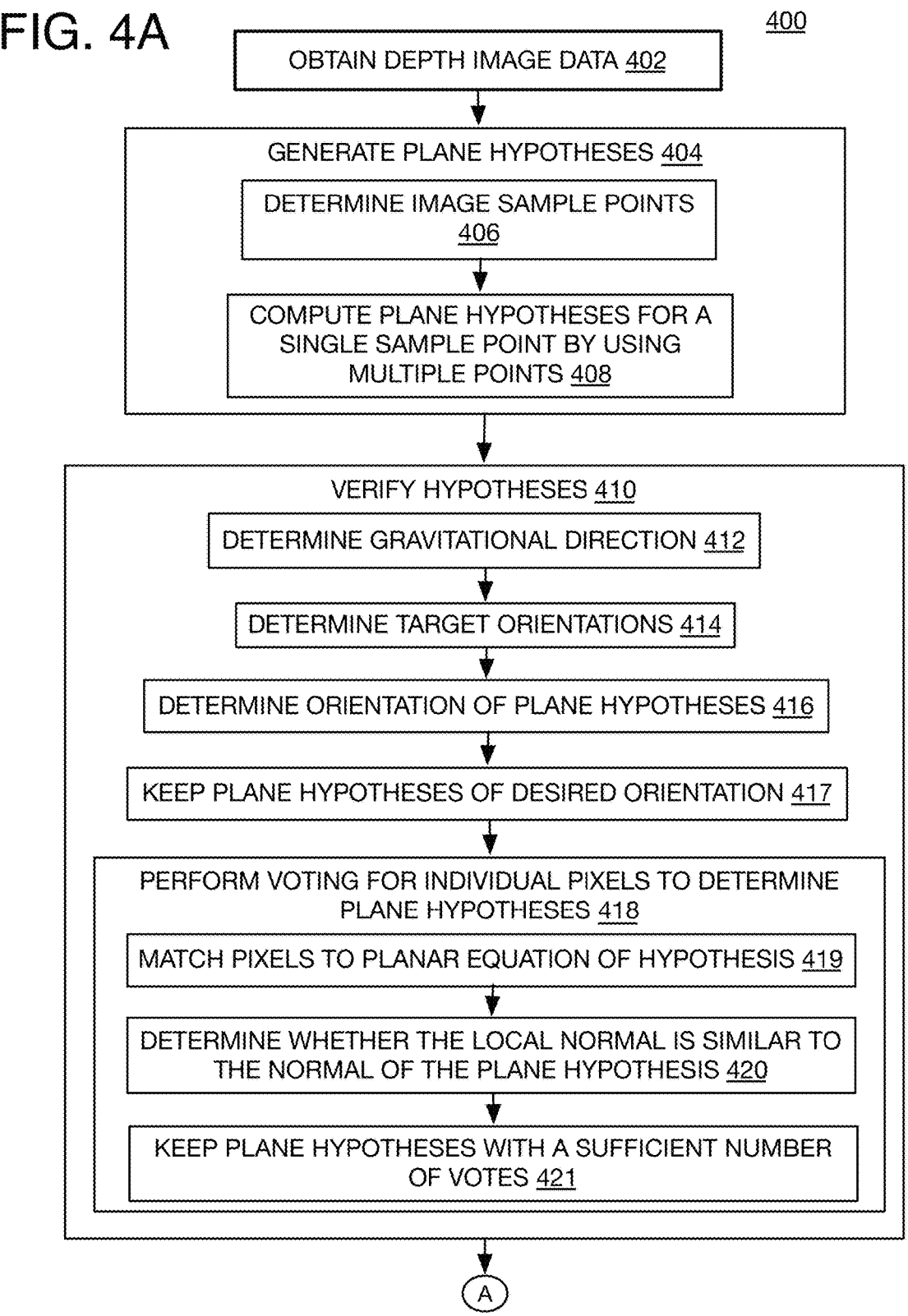
FIGS. 4A-4B is a detailed flow chart of a planar surface detection process in accordance with the implementations herein.
Figure 4B:
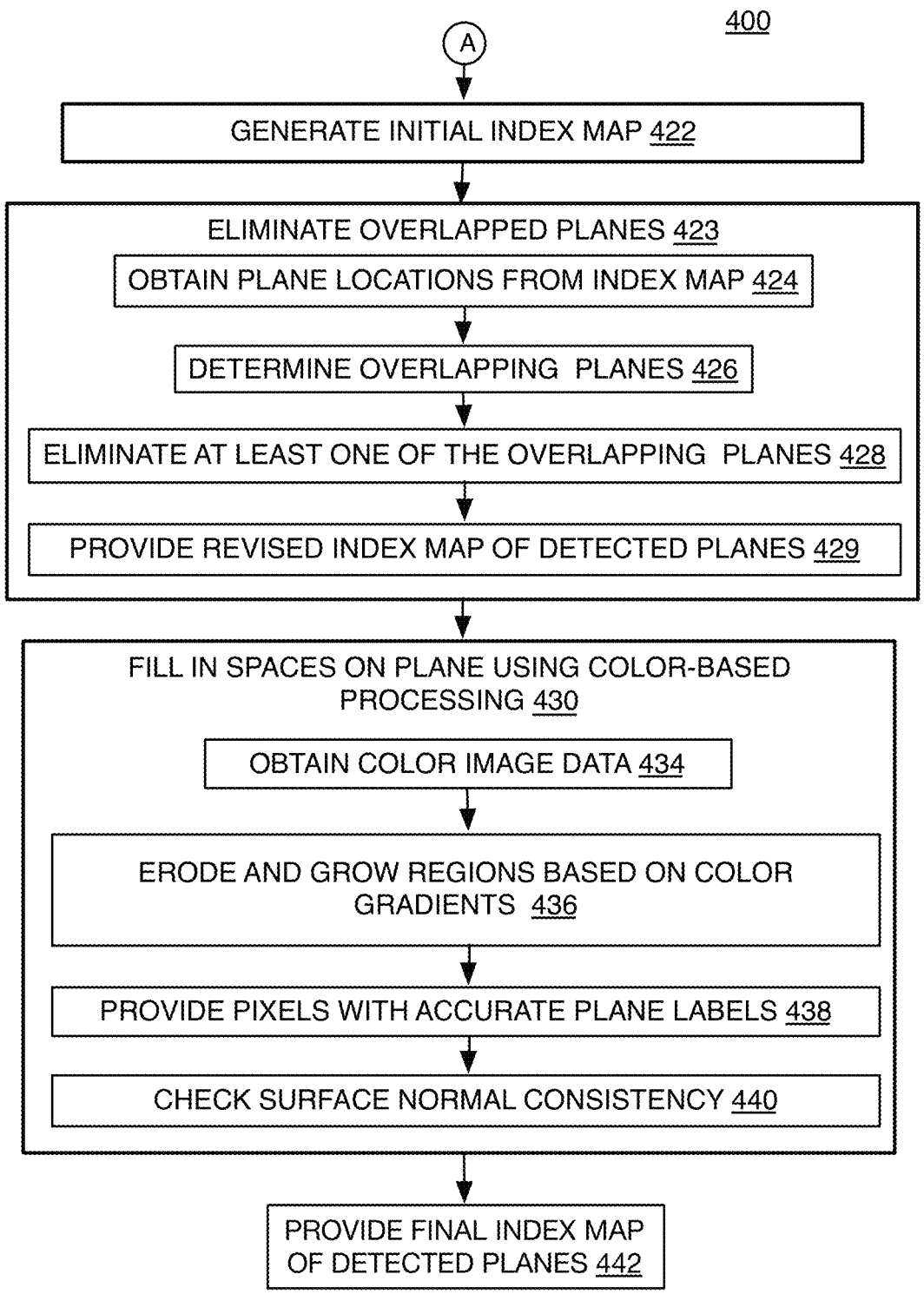

Referring to FIGS. 4A-4B, a process 400 is provided for a method and system of planar surface detection for image processing. In the illustrated implementation, process 400 may include one or more operations, functions or actions 402 to 442 numbered evenly. By way of non-limiting example, process 400 may be described herein with reference to example image processing system 1000 of FIG. 10 respectively, and where relevant.

Process 400 may include "obtain depth image data" 402. In most cases, depth images or depth maps are formed from pre-processed raw image data. This could include demosaicing, noise reduction, pixel linearization, shading compensation, resolution reduction, vignette elimination, and/or 3A related operations including automatic white balance (AWB), automatic focus (AF), and/or automatic exposure (AE) modifications, and so forth.

Also, as mentioned herein, depth image data may be determined by a stereo camera system that captures images of the same scene from multiple angles. The system may perform an initial rectification operation on the multiple images before the features in the different images are then matched. Triangulation algorithms, or other equivalents, may be used to determine a 3D space for the scene in the image and the depth dimension for each point, pixel, or feature in the image. Otherwise, other ways to determine three dimensions from one image are possible such as time-of-flight, structural or coded light technologies. A table or depth map of depth values for each pixel value (or in other words, the formation of 3D (x, y, z) coordinates) for the content at each pixel forms the depth image data.

Process 400 may include "generate plane hypotheses" 404. Particularly, the plane hypotheses generation step has at least two stages. In the first stage (image sampling), the depth image is sampled to select sample points each to have a plane hypothesis. By one example, the sample points may be selected according to a sampling density s. That is, one pixel out of every s pixels is selected within the image to be a sample point. s is an application-dependent sampling density parameter as explained below.

In a second stage (hypothesis computation), the sample points are used to compute the plane hypotheses. By forming a plane hypothesis for each sample point rather than for each bin in the quantized parameter space, the computational load for detecting the planar surfaces in the image is reduced significantly resulting in a large increase in frame rate during the detection process.

In more detail now, process 400 may include "determine image sample points" 406, and particularly includes selecting sample points from the depth image or depth map of an image being processed. The sampling density s is selected based on a user defined parameter, minArea, denoting the minimum area in meter squared of the plane a client user (i.e., the application) would like to detect. User selection here refers to which application a user is operating, and the minimum plane area minArea may be pre-set or selected automatically depending on the application. The values for minArea may be determined by experimentation. By one example, the minArea may be set smaller than the actual plane size to better ensure at least one hypothesis sampling covers the target plane. As a result, s will be larger for far range applications (larger minArea), such as scenic photography applications, and s is smaller for close range applications (smaller minArea), such as augmented reality applications that permit overlays or virtual object insertion into real world images such as with photo enhancement, slide show, and/or movie production programs. By one example, minArea is set to 0.04 meter squared, or in one other case, about 25 to 625 square pixels depending on the application.

Figure 5:
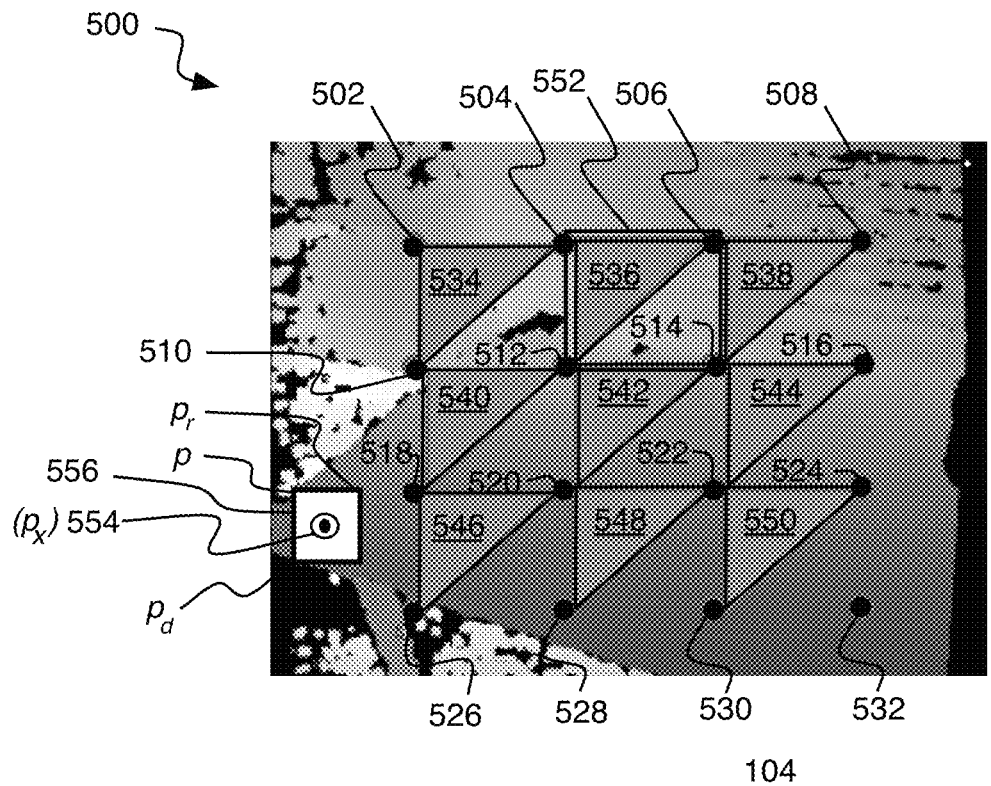
FIG. 5 is a schematic diagram over an image to explain depth image sampling for the planar surface detection process disclosed herein.

Referring to FIG. 5, an example image 500 is provided that shows selected sample points 502 to 532 numbered evenly and forming triangular areas 534 to 550 numbered evenly. Each set of three sample points, a main sample point and one to the right and one below the main sample point, forms one of the triangular areas which may be part of, or may be considered to be, a plane hypothesis. With this arrangement then, s is selected such that a plane of minArea can cover at least one of the triangular areas so that the triangular area is guaranteed to be sampled, and the triangular area's math representation, i.e. its plane equation, can be included as one of the plane hypotheses. Here, by one example, a plane 552 of minArea is shown. Mathematically then, sampling density s may be determined as follows.

$$s=\sqrt{A}/2, \quad (3)$$

where A is the maximum possible area size in pixels of the plane of minArea, and $$\sqrt{A}=f/\text{minZ}*\sqrt{\text{minArea}}, \quad (4)$$

where f is the focal length of the camera (or cameras), which can usually be found in the camera specifications, and minZ is the minimum depth the camera can sense. By a different alternative, minZ can be replaced with d, the average depth of the current depth image to get a better estimate for the parameter s. Typically, s ranges from about 5 to 25 pixels.

Whichever way s is selected, the image may be sampled every s pixels, and in one case both horizontally and vertically in horizontal and vertical arrays with uniform spacing although many other arrangements could work. The sample points are discarded when the sample points do not have sufficient image space to form a plane of a triangular area of (s×s)/2. This may occur when the sample point is too close to the right or bottom edge of the image for the example of image 500 where the plane is determined to the right and downward from the main sample point.

Otherwise, it will be understood that other alternatives for computing density s could be possible, such as selecting s based on screen size so that s fits evenly across the screen without extra pixel columns or rows, or s may vary (or may be limited to areas of the image) according to detected content in the image, such as gradients that reveal edges, or a lack of large gradients detecting flat, uniform areas of color in the image. Also, a horizontal s could be different from a vertical s, or the arrays may run in directions other than horizontal or vertical (such as diagonal or even circular or curved) as long as three sample points are available to form each plane hypothesis. Yet another possibility would be to adaptively determine s based on the average depth of the local areas on the depth image. Thus, there may be a smaller s for a larger z coordinate.

Process 400 may include "compute plane hypotheses for a single sample point by using multiple points" 408, and by one example, multiple sample points. This operation comprises the use of the three-dimensional coordinates of the samples points on the depth image and in an algebraic equation for a plane. In more detail, given a depth image D and set X of 3D coordinates $(x_p, y_p, z_p)$ of each pixel p on the image D, the problem of planar surface extraction is to determine a set of plane equations where:

$$H=\{h:a_h x+b_h y+c_h z+d_h=0\} \quad (5)$$

and an assignment function:

$$F:D \rightarrow H, \quad (6)$$

assigning each pixel p to a plane h. Instead of the conventional plane detection algorithms, such as the Hough Transform, that determines all possible plane hypotheses of $\{a_h, b_h, c_h, d_h\}$, here a plane hypothesis is computed for the directly sampled depth pixels along with its right and down neighbor sampled depth pixel by using their 3D coordinates forming the triangular area or portion of the plane as shown on image 500 and as described above for sampling. The sample point of the three samples points forming a triangular area that is the sample point assigned the plane hypothesis may be referred to as the main sample point or pixel to differentiate among the three sample points. For example, point 502 may be the main sample point for plane 534 while sample points 504 and 510 are also used to form plane 534, and where each triangular area forming a plane is similarly formed.

In the present case, the plane hypothesis parameters in the plane hypothesis equation may be determined by finding the normal of the plane. For example, the three sample points forming the triangular area or plane first may be used to determine two vectors forming the plane both stemming from the main sample point. Thus, sample points 502 and 504 may form a first vector $\vec{a}$, while sample points 502 and 510 form a second vector $\vec{b}$. The three dimensional points of each of the three sample points then may be used to determine the normal of the plane by finding the cross product of the two vectors where:

$$\vec{a} \times \vec{b} = N_s(a_h, b_h, c_h) \quad (7)$$

Another way to state this is:

$$N_s=(p_{sr}-p_s) \times (p_{sd}-p_s) \quad (8)$$

where $N_s$ is a Normal vector of the plane hypothesis based on the sample points, and continuing with the example of plane 534 on image 500, where $p_s$ is the main sample point (502 for example), $p_{sr}$ is the next sample point to the right of the main sample point (at 504 for example), and $p_{sd}$ is the next sample point lower than (or down from) the main sample point (510 for example). The normal $N_s$ is then inserted into the plane-point equation:

$$a_h(x_p-x)+b_h(y_p-y)+c_h(z_p-z)=0 \tag{9}$$

where the actual values for the main sample point p(x, y, z) are inserted into the equation, and which then may be reduced to the four parameter plane equation form (equation (10) below) to generate the plane hypothesis for the main sample point:

$$a_hx_p+b_hy_p+c_hz_p+d_h=0 \tag{10}$$

The ($a_h$, $b_h$, $c_h$) parameter values of normal $N_s$ as inserted into the planar equation to form a plane hypothesis also then may be used for voting to compare against a local normal $N_p$ as described below. Thus, the output of the plane hypothesis generation stage is a set of plane hypotheses in the form of math equation:

$$\{(a_h,b_h,c_h,d_h)|\cdot a_hx_p+b_hy_p+c_hz_p+d_h=0\} \tag{11}$$

Since the present algorithm generates plane hypotheses by directly sampling the depth image that includes using those sample points that already exist in the depth image, this leads to a great reduction of the search space from several hundred thousands of initial hypotheses generated by the conventional system to around merely two or three thousand initial hypotheses for images of size 1920*1080.

Process 400 may include "verify hypotheses" 410, and particularly to at least eliminate some of the plane hypotheses due to the orientation of the plane, and to perform a pixel vote to determine which pixels support (or are likely to be on) which plane hypothesis. Particularly, most augmented reality applications are mainly interested in planar surfaces that are a specific orientation such as parallel or perpendicular to the ground which suggest the planar surfaces are floors or walls in an image. In this case, only those plane hypotheses that conform to the user or application requirements may be retained. For instance, if the user or application requires the detection of only horizontal planes, the system retains those plane hypotheses that extend horizontally. Horizontal or vertical directions may be determined by obtaining, or sensing, the gravitational direction.

In more detail, process 400 may include "determine gravitational direction" 412. A gravitational direction g may be derived from one or more inertial measurement unit (IMU) sensors, such as the accelerometer and gyroscope available on almost every mobile smart device.

Process 400 may include "determine target orientations" 414. The user's application provides a request for a plane in either vertical or horizontal orientation. This could originate from an inputted request from the user and into the application or could be automatically generated by the application in the first place.

Process 400 may include "determine orientation of plane hypotheses" 416, and particularly by obtaining the normals $N_s$ of the plane hypotheses (by obtaining the parameters of the plane hypothesis equation) as described above and used for obtaining the plane hypotheses in the first place. The normals are then compared to the gravitational direction and may be labeled parallel or perpendicular (or other angle) relative to the gravitational direction.

Process 400 then may include "keep plane hypotheses of desired orientation" 417. When the user's application is searching for horizontal planes, the system will search for plane hypotheses with a plane normal vector parallel to the gravitational direction. Likewise, when the user's intention is searching for a vertical plane, the system will search for plane hypotheses with a plane normal vector perpendicular to the gravitational direction. For instance, when the user's application searches for planes parallel to the ground (horizontal plane hypotheses), the system only keeps those plane hypotheses that satisfy the following:

$$|g^TN|\approx \text{``1''} \tag{12}$$

and likewise for planes perpendicular to the ground and $$|g^TN|\approx \text{``0''} \tag{13}$$

where N denotes the plane normal, and superscript T denotes vector transpose, and $g^TN$ denotes vector dot product between g and N.

Next, the present method uses a voting scheme in which multiple pixels, and in one form each pixel, of the depth image "votes" as to which of the existing plane hypotheses the pixel belongs on (or supports). Plane hypotheses that receive sufficient support are the candidates for the final output. Thus, Process 400 may include "perform voting for individual pixels to determine plane hypotheses" 418, and for one example, for every pixel in the image. In other words, for every plane hypothesis h in the hypothesis set, the method determines how many pixels in the depth image are on the plane parameterized by h. For the present voting operation during this hypotheses verification stage, it is determined whether a pixel p supports a hypothesis by not only testing how well it fits the plane equation but also by comparing the plane normal with the surface normal computed from its local neighborhood.

In more detail, this may initially include "match pixels to planar equation of hypothesis" 419. Thus, as an initial operation, it is determined whether a pixel p with 3D coordinate ($x_p$, $y_p$, $z_p$) is on plane h($a_h$, $b_h$, $c_h$, $d_h$) if:

$$|a_hx_p+b_hy_p+c_hz_p+d_h|\leq\delta\approx 0 \tag{14}$$

by plugging the pixel coordinates into the equation, and where the threshold δ is determined by experimentation to compensate for depth camera noise. For example, due to noise, if the precision of the depth camera is σ=1 centimeter (i.e. the sensor cannot measure distance under 1 centimeter) when it is 1 meter away from the scene, then δ should be set larger than σ*$z_p$. Here, we assume the precision degrades linearly with the distance between the camera and the scene.

By one form, this is not the only condition for voting to determine whether a pixel is on a plane hypothesis. The voting process then may include "determine whether the local normal is similar to the normal of the plane hypothesis" 420. The present method or system may obtain the area of the image around the current pixel being matched to a plane hypothesis and used to determine the local or neighbor normal in a number of different ways. By one example, for every pixel p, a right neighbor $p_r$ and down neighbor $p_d$, the method computes a local surface normal around p, where:

$$N_p=(p_r-p)\times(p_d-p) \tag{15}$$

where $N_p$ is the local normal vector among the three neighbor pixels. The pixel p will only be said to be on plane or vote for h if equation (15) is satisfied and the vector is satisfied as follows:

$$N_p\approx(a_h,b_h,c_h) \tag{16}$$

where $a_h$, $b_h$, $c_h$ are obtained directly from the planar equation of the plane hypothesis (equation (14)). Also, the normals need not always be exactly the same to find a supporting pixel, but could be within a threshold or other criteria. Here, the normals are considered sufficiently close if the angles between them is small. In our implementation, we use 40 or 60 degrees as the threshold for depth sensors with low/high noise level. This may be set lower than 40 degree differences for very low depth noise images. This additional test may make the fitting of the plane smoother or more accurate at the boundaries of the plane.

Referring again to FIG. 5, it should be noted that the example provided above with equations (15) and (16) may include the arrangement where p, $p_r$, and $p_d$ are immediate neighbors, or adjacent pixels. By other possible options, the local area used to determine the local normal should be set larger to better sample a larger area around the pixel being analyzed. In this case, when the pixel to be checked is point 554 for this option (referred to as $p_x$ for clarity), the point $p_x$ 554 may be at least generally centered within a local surface area 556, so that the three points p, pr, and pd used in the equation to determine the local surface normal $N_p$ for the local surface area 556 form the corners of the local area 556. Also in this case, it will be understood that it is $p_x$ that is tested in the first initial test using the plane equation (14) above rather than p. By other options, the point or pixel $p_x$ being tested may be at least generally located at or near the center of a triangular area formed by the three points p, pr, and pd. By one example, the local surface area 556 may be a square formed of about 3×3 pixels so that p, pr, and pd are 3 pixels away from each other at three corners of the square. Many other sizes of the local surface area are contemplated. In one implementation, a square of 3 by 3 pixels is used.

Process 400 may include "keep plane hypotheses with a sufficient number of votes" 421. The plane hypotheses that have votes below a threshold are considered as outliers and removed from the hypothesis set. By one example, the threshold is set to $s^2$ which is the area in pixels of the minimum plane as mentioned above. It will be understood a pixel could vote for more than one plane hypothesis which could indicate overlapping planes.

Process 400 may include "generate initial index map" 422. Specifically, the result of the verification stage is a list of qualified plane hypotheses for an image, and these are the candidate plane hypotheses going forward for that image. An initial index map is formed that associates each qualified plane hypothesis with a list of supporting pixels so that multiple, or every, image pixel is mapped to its corresponding plane equation whenever a pixel was successfully mapped to a plane hypothesis for the image.

Figure 6:
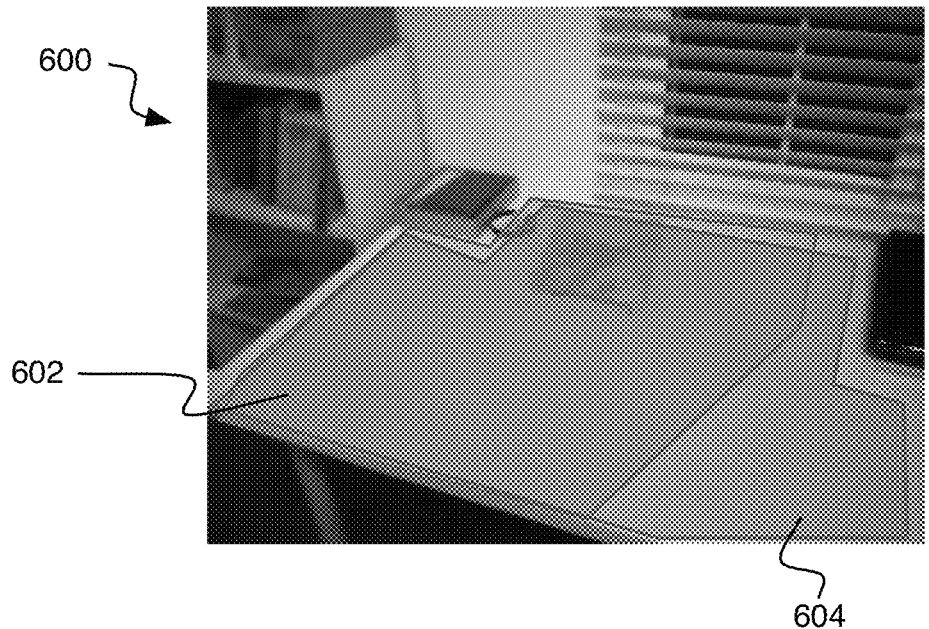
FIG. 6 is a schematic diagram over an image to explain selection among overlapping planes.

Referring to FIG. 6, after the verification stage, the method may optionally include an operation to perform a non-maximum suppression to retain the plane hypothesis with the largest area when two or more plane hypotheses overlap in order to achieve labeling limited to a single plane hypothesis and so that no pixel is included in multiple plane hypotheses. Viewing image 600, plane hypothesis 602 overlaps with larger plane hypothesis 604 and will be removed according to the present method. Thus, process 400 may include "eliminate overlapped planes" 423. This may include "obtain plane locations from index map" 424. Thus, the system may obtain the list of plane hypotheses so far and the pixels supporting each plane hypothesis.

Process 400 may include "determine overlapping planes" 426. By reviewing the index map, the system may find those plane hypotheses that are sharing the same pixels. Such plane hypothesis are then identified as overlapping. It will be appreciated that there may be a required minimum number of threshold pixels that must be on multiple plane hypotheses to identify the plane hypothesis as overlapping. Such a threshold may be set at around 30% of the pixels of any of the considered planes.

Process 400 may include "eliminate at least one of the overlapping planes" 428. Thus, when overlapping plane hypotheses are identified, one of the planes are eliminated from the index map. By one example, the larger plane in terms of the total number of supporting pixels is kept.

Process 400 may include "provide revised index map of detected planes" 429 so that a revised index map is produced from the plane hypotheses that survive the non-maximum suppression.

Process 400 next may include "fill spaces on plane using color-based processing" 430. Particularly, it will be understood that each pixel that supports a plane hypothesis, and in turn each pixel in the index map, may have a label that identifies the pixel's plane hypothesis. However, since the depth signals are usually noisy, the resulting index map is not smooth. This may occur when a pixel or point clearly should have been assigned to a plane hypothesis but is not, and in this case, the label may be missing, and this may create artifacts such as a hole in the interior of the plane or a gap along the outer boundary of the plane. Such pixels that should have been placed on a plane but may be causing artifacts on the plane instead may be referred to as isolated pixels.

Thus, different from previous methods which only use depth information for plane detection, the present planar surface detection method and system also may include a color-based post-processing operation to reduce the artifacts due to depth noise. For this purpose, the present planar detection method may include color-based processing before outputting the final result. By one example form, a region $R_i$ is formed by all of the pixels with plane label i on the index map so that each plane is its own region. The isolated pixels will be filled naturally in process 436 below so that initial separate detection of the isolated pixels is normally omitted.

Process 400 then may include "obtain color image data" 434, and particularly the chroma values of the pixels in the image.

Process 400 then may include "erode and grow regions based on color gradients" 436, and where each region is a plane hypothesis by one example. Thus, individual regions are eroded and grown by replacing the plane index of the isolated pixels to better match the index in the surrounding pixels of the plane hypothesis to which the current pixel should be supporting. This may be performed by determining pixel-to-pixel color gradients among nearby pixels and using filter-type structure elements with known patterns and that are moved pixel to pixel at least over the isolated pixel areas. Such an erosion and region growth process is provided by R. C. Gonzalez et al., Digital Image Processing, 3rd Edition, pp. 630-635, Aug. 31, 2007. The region may be grown until a local maximum color gradient or the boundary of a previously processed region is reached. This at least improves the plane boundary due to inaccurate depth (z) coordinates along the plane boundaries.

Once the isolated pixels initially without plane indices has its region assigned through erosion and region growth, the process 400 may include "provide pixels with accurate plane labels" 438 to provide the previously isolated pixels with the index of the hypothesis that accounts for the region the isolated pixel is in. Also, during the region growing process, process 400 may include "check surface normal consistency" 440 to avoid over-growing. This may include the operation of checking a local surface normal now using the 3D coordinates of the pixel, and against the plane hypothesis normal as described above for voting.

It will be appreciated that this color-based analysis may be performed for each region (or plane) found on the image, from largest region to smallest region. Other variations are possible. For example, it can also performed in the order of the plane distance to the camera.

Figure 7:
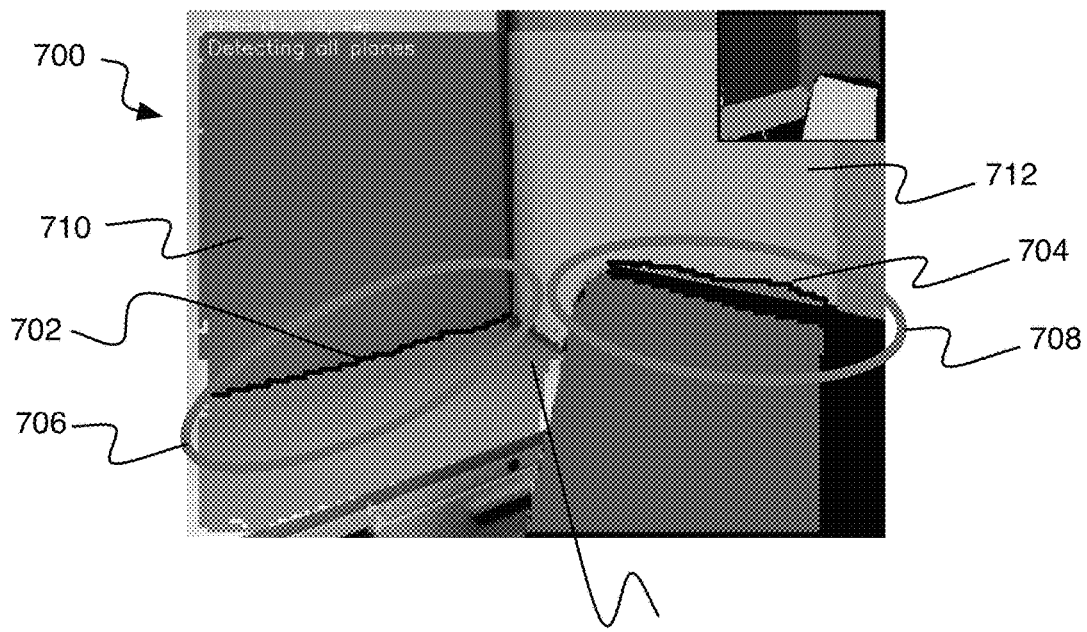
FIGS. 7-8 are images with and without color-based processing respectively for reducing gaps and holes in the planes for the planar surface detection process herein.
Figure 8:
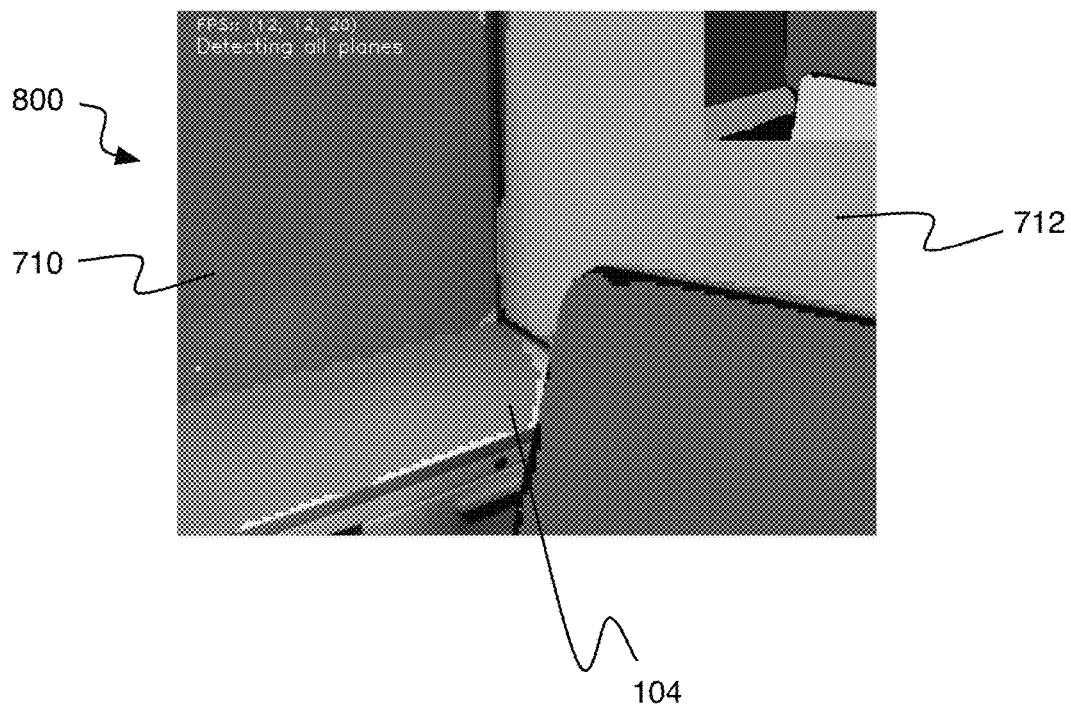

Referring to FIGS. 7-8, image 700 is an example of planar detection by the current method without color-based processing, and image 800 includes the planar detection with the color-based processing. Both show the final results of the index map. The outlined areas 702 and 704 in circled areas 706 and 708 show isolated pixels of planes 710 and 712 that were changed for a better quality image and more accurate plane detection as shown in image 800. One area (line 702) shows a jagged boundary to be smoothed, and area 704 shows pixels of a wrong color.

Process 400 may include "provide final index map of detected planes" 442. Thereafter, the index map including a list of the plane hypotheses and list of supporting pixels for each plane may be provided to an image augmenting application as mentioned herein.

The entire algorithm was found to run very fast, achieving 320 fps on a high-end desktop with Intel i7-4770K, 150 fps on a Lenovo laptop, and 80 fps on a low end Gigaybyte tablet with Intel® Atom™.

Figure 9:
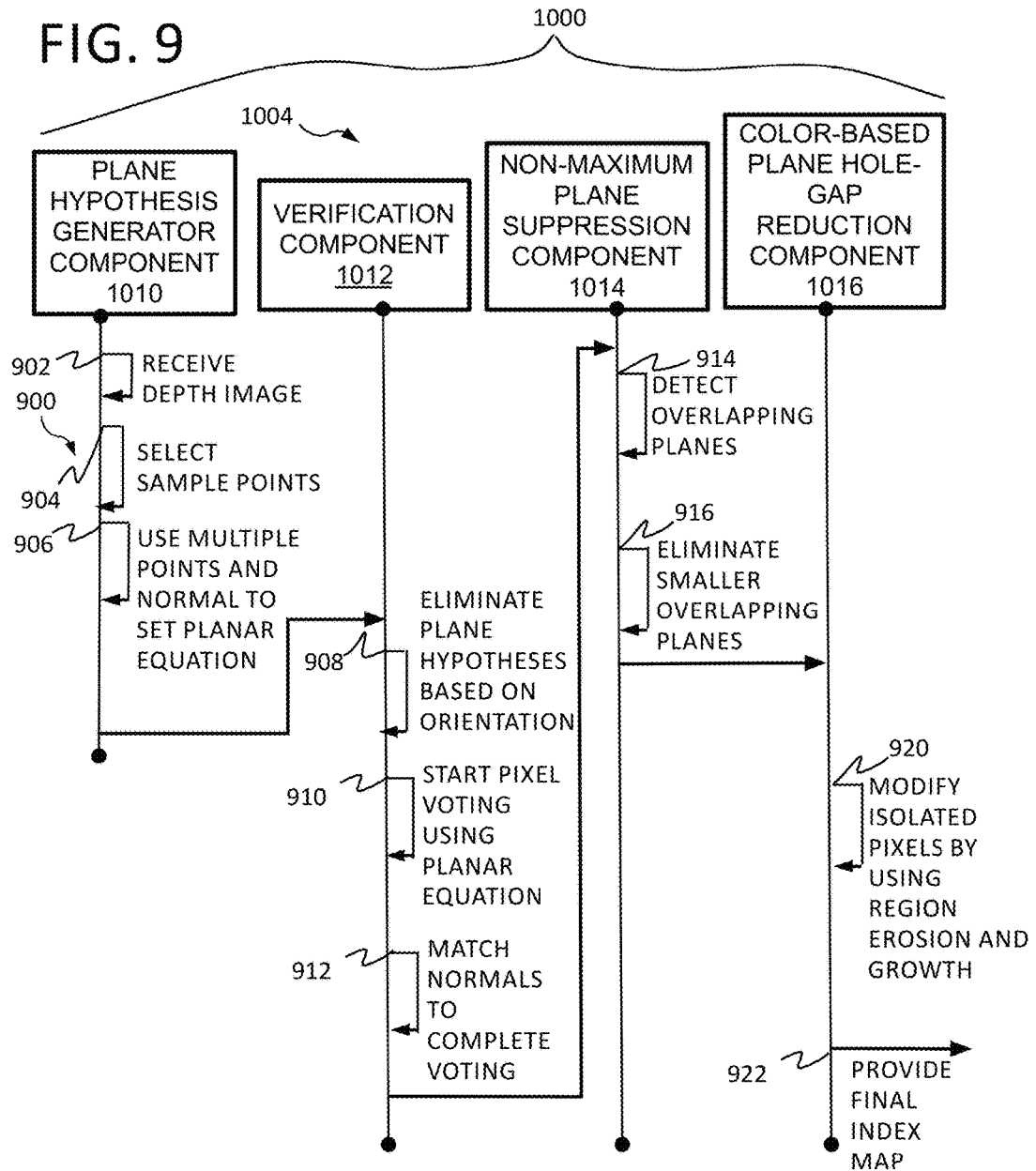
FIG. 9 is a diagram of the planar surface detection method in operation of an example system described herein.

Referring to FIG. 9, process 900 illustrates the operation of a sample image processing system 1000 that performs planar surface detection for image processing in accordance with at least some implementations of the present disclosure. In more detail, in the illustrated form, process 900 may include one or more operations, functions or actions as illustrated by one or more of actions 902 to 930 numbered evenly. By way of non-limiting example, process 900 will be described herein with reference to FIG. 10. Specifically, system 1000 includes logic units or modules 1004. The logic modules 1004 may include a depth map generator unit 1006 and a planar surface detection unit 1008. The planar surface detection point 1008 may have a plane hypothesis generator component 1010, a verification component 1012, a non-maximum plane suppression component 1014, and a color-based hole-gap reduction component 1016. The operation of the system may proceed as follows.

Process 900 may include "obtain depth image" 902, and as described above with processes 300 and 400, where the raw image data has already been pre-processed, and the content of the image analyzed to provide 3D coordinates for each of the pixel points to form a depth image. It will be understood that when the images are frames in a video sequence for any of the processes mentioned herein that the process may apply to each depth image formed for each frame or other time period, and when multiple cameras are used, the depth image may be associated with, or representing, a three-dimensional space formed from multiple images of the same scene (which may or may not capture the scene at the same time instance).

Process 900 may include "select sample points" 904. Particularly, a sample point selection is performed so that a plane hypothesis is generated for multiple or each sample point so that a plane hypothesis need not be generated separately for each pixel point in the image. Thus, the sample points are spaced throughout the image, and by one form, the spacing may depend, at least in part, on the focal length of the camera(s) as well as either a minimum depth a camera providing the image can sense or an average depth detected in the image, as described in greater detail above. By one example form, the sample point spacing is set depending on the application that is to use the plane hypothesis for image augmentation. It has been found that applications using far ranges, such as with photography, a larger spacing should be used, while applications that use close ranges, such as with augmented reality applications, should use a smaller sample point spacing.

Process 900 may include "use multiple points and normal to set planar equation" 906, and as described above, three sample points may be used to form two vectors, and the cross-product of the vectors (the normal of the plane formed by the three sample point) is used to determine the parameter values of the planar equation form (see equation (11) above) for each sample point. This is performed for each main sample point that has two other sample points at the sample spacing that are still within the image. Other variations are possible as mentioned above. This avoids the need to test a range of possible parameter values for the planar equation and for each pixel point of the image.

Process 900 may include "eliminate plane hypotheses based on orientation" 908. Thus, during the verification stage, an option is provided to determine the orientation of the plane hypotheses so far, and by using an inertial measurement unit (IMU). Once the orientations of the plane hypotheses are determined, the orientations may be compared to the desired orientation from a user's application for example. If the orientations are the same or similar, the plane hypothesis is kept while other plane hypotheses with the wrong orientation are dropped.

Process 900 may include "start pixel voting using planar equation" 910, or in other words, perform voting to determine which pixels have content on the image that is likely to exist on at least one of the plane hypotheses. This first may include plugging the pixel coordinates into the planar equation of a plane hypothesis and determining whether the result meets a criteria, such as being below a threshold as described above.

Process 900 then may include "match normals to complete voting" 912. This may include comparing a normal of a plane hypothesis (in the form of the parameters of the planar equation of the plane hypothesis) to a local area normal of a point on the image to determine whether the point is on (or votes for) the plane hypothesis. The normal of the plane hypothesis is already computed when establishing the plane hypothesis equation as explained above. To determine a local surface normal, the point that is voting may be located at either (1) at or near a corner of a local area used to determine the local area normal or (2) at or near a center of the local area or a center of three points forming the normal. With either (1) or (2), three points are used to determine the local area in a triangular position as with the sample points except here the three points are not necessarily sample points. The local area may simply be a certain shaped area (like square) at a certain size, such as about 3×3 as one possible example, either with the voting point at or near the center of the space or at the corner of the space. In either case, the coordinates of the three corners of the space are used to compute the local normal as explained above. The result is an initial index map showing which pixels support which plane hypotheses.

Process 900 may include "detect overlapping planes" 914, and generally determine which pixels support more than one plane hypothesis by searching through the index map. The process 900 then may include "eliminate smaller overlapping planes" 916, so that the smaller, by one form in total number of pixels supporting the plane, is dropped. The index map is revised to reflect which plane hypotheses are dropped.

Process 900 may include "modify isolated pixels by using region erosion and growth" 920, and as explained above, these are the pixels that do not support a plane hypothesis but it appears that the pixels should support a hypothesis such as when all surrounding points, or surrounding points on a certain number of sides of the pixel, support a certain plane hypothesis. In this case, region erosion and region growth techniques are applied to the isolated pixels as explained above, and in order to fill holes and gaps, or otherwise to smooth out boundaries, in the plane hypothesis. This also results in the pixel receiving a new label that identifies it as supporting the plane hypothesis.

Process 900 may include "provide final index map" 922. Thus, a final index map is provided listing the final approved plane hypotheses as well as the pixels that support each plane hypothesis. The index map then may be used by an application that is augmenting the image to place a virtual object on the planar surface of one of the plane hypotheses in the final index.

In addition, any one or more of the operations of FIGS. 3, 4A-4B, and 9 may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more processor core(s) may undertake one or more of the operations of the example processes herein in response to program code and/or instructions or instruction sets conveyed to the processor by one or more computer or machine-readable media. In general, a machine-readable medium may convey software in the form of program code and/or instructions or instruction sets that may cause any of the devices and/or systems to perform as described herein. The machine or computer readable media may be a non-transitory article or medium, such as a non-transitory computer readable medium, and may be used with any of the examples mentioned above or other examples except that it does not include a transitory signal per se. It does include those elements other than a signal per se that may hold data temporarily in a "transitory" fashion such as RAM and so forth.

As used in any implementation described herein, the term "module" refers to any combination of software logic, firmware logic and/or hardware logic configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth. For example, a module may be embodied in logic circuitry for the implementation via software, firmware, or hardware of the coding systems discussed herein.

As used in any implementation described herein, the term "logic unit" refers to any combination of firmware logic and/or hardware logic configured to provide the functionality described herein. The logic units may, collectively or individually, be embodied as circuitry that forms part of a larger system, for example, an integrated circuit (IC), system on-chip (SoC), and so forth. For example, a logic unit may be embodied in logic circuitry for the implementation firmware or hardware of the coding systems discussed herein. One of ordinary skill in the art will appreciate that operations performed by hardware and/or firmware may alternatively be implemented via software, which may be embodied as a software package, code and/or instruction set or instructions, and also appreciate that logic unit may also utilize a portion of software to implement its functionality.

As used in any implementation described herein, the term "component" may refer to a module or to a logic unit, as these terms are described above. Accordingly, the term "component" may refer to any combination of software logic, firmware logic, and/or hardware logic configured to provide the functionality described herein. For example, one of ordinary skill in the art will appreciate that operations performed by hardware and/or firmware may alternatively be implemented via a software module, which may be embodied as a software package, code and/or instruction set, and also appreciate that a logic unit may also utilize a portion of software to implement its functionality.

Figure 10:
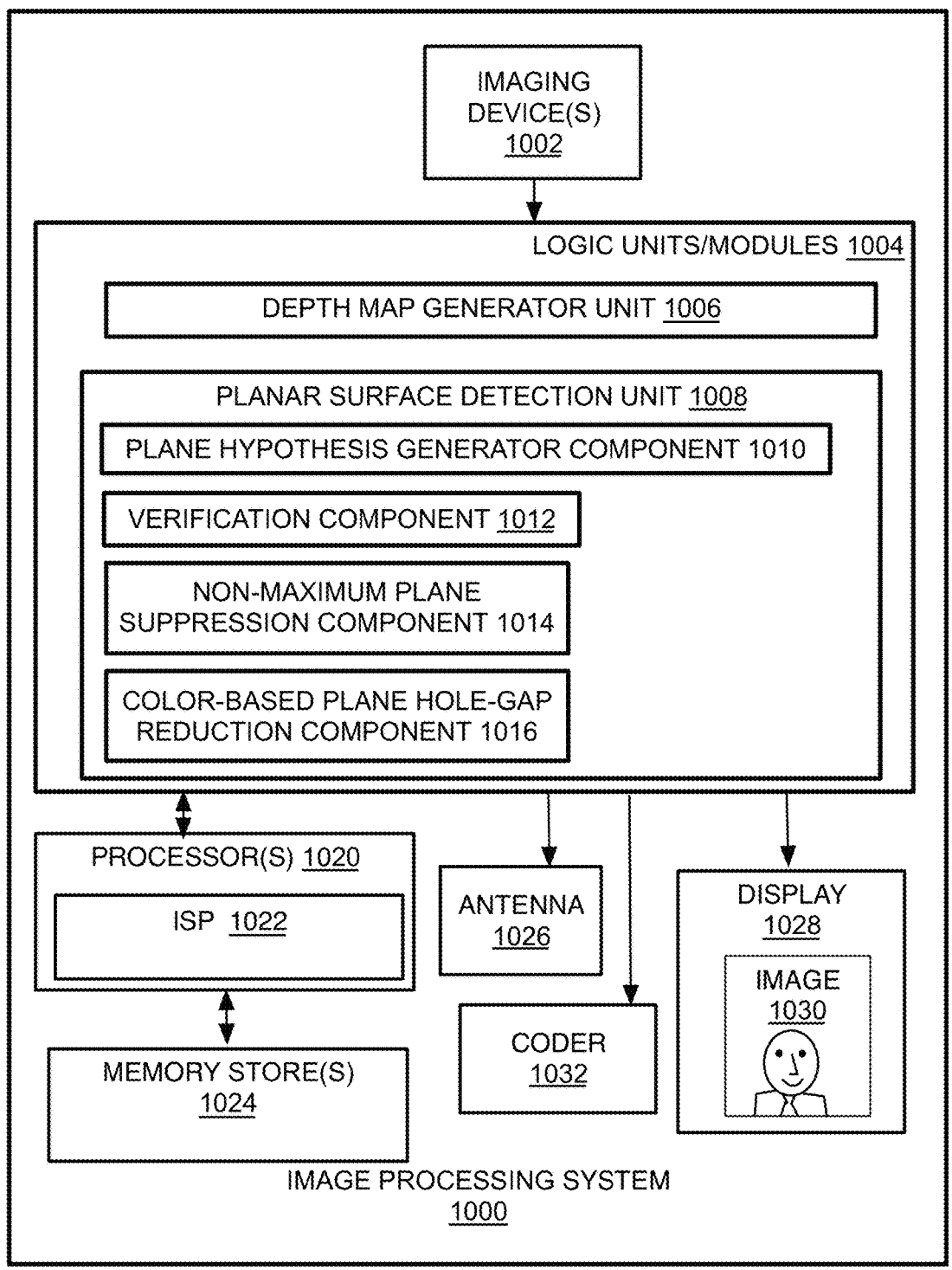
FIG. 10 is an illustrative diagram of an example system.

Referring to FIG. 10, an example image processing system 1000 is arranged in accordance with at least some implementations of the present disclosure. In various implementations, the example image processing system 1000 may have an imaging device 1002 to form or receive captured image data. This can be implemented in various ways. Thus, in one form, the image processing system 1000 may be one or more digital cameras or other image capture devices, and imaging device 1002, in this case, may be the camera hardware and camera sensor software, module, or component. In other examples, imaging processing system 1000 may have an imaging device 1002 that includes or may be one or more cameras, and logic modules 1004 may communicate remotely with, or otherwise may be communicatively coupled to, the imaging device 1002 for further processing of the image data.

Thus, image processing device 1000 may be a single camera on a multi-camera device such as a smartphone, tablet, laptop, or other mobile device. Otherwise, device 1000 may be the tablet or other device with multiple cameras where the processing occurs at one of the cameras or at a separate processing location communicating with the cameras whether on-board or off of the tablet or other device, and whether the processing is performed at a mobile device or not.

In any of these cases, such technology may include a camera such as a digital camera system, a dedicated camera device, or an imaging phone or tablet, whether a still picture or video camera, camera that provides a preview screen, or some combination of these. Thus, in one form, imaging device 1002 may include camera hardware and optics including one or more sensors as well as auto-focus, zoom, aperture, ND-filter, auto-exposure, flash, and actuator controls. These controls may be part of a sensor module or component for operating the sensor that can be used to generate images for a viewfinder and take still pictures or video. The imaging device 1002 also may have a lens, an image sensor with a RGB Bayer color filter, an analog amplifier, an A/D converter, other components to convert incident light into a digital signal, the like, and/or combinations thereof. The digital signal also may be referred to as the raw image data herein.

Other forms include a camera sensor-type imaging device or the like (for example, a webcam or webcam sensor or other complementary metal-oxide-semiconductor-type image sensor (CMOS)) in addition to, or instead of, the use of a red-green-blue (RGB) depth camera and/or microphone-array to locate who is speaking. The camera sensor may also support other types of electronic shutters, such as global shutter in addition to, or instead of, rolling shutter, and many other shutter types. In other examples, an RGB-Depth camera and/or microphone-array might be used in the alternative to a camera sensor. In some examples, imaging device 1002 may be provided with an eye tracking camera.

In the illustrated example and relevant here, the logic modules 1004 may include a depth map generation unit 1006 that performs depth algorithms typically on multiple images of the same scene, and to form a three dimensional space where the pixels or points have three dimensional (x, y, z) coordinates on a resulting depth map or depth image that represents the three dimensional space (or 2D image or set of images of the same scene). The logic modules also may include a planar surface detection unit 1008 to detect the planar surfaces in the depth image. The planar surface detection unit 1008 may have a plane hypothesis generator component 1010 to compute the plane hypotheses based on the depth image data, a verification component 1012 to perform the pixel voting as well as to optionally eliminate plane hypothesis based on orientation. A non-maximum plane suppression component 1014 may be provided to optionally eliminate one or more overlapping planes to reduce redundancy, and a color-based plane hole-gap reduction component 1016 may be provided to refine the quality of the plane hypothesis as described above. In these examples, the logic modules 1004 may be considered to be separate from the imaging device or may be considered to be part of the imaging device, or one of the imaging devices when multiple imaging devices are provided.

The image processing system 1000 may have one or more processors 1020 which may include a dedicated image signal processor (ISP) 1022 such as the Intel Atom, memory stores 1024, one or more displays 1028 to provide images 1030, a coder 1032, and antenna 1026. In one example implementation, the image processing system 1000 may have the display 1028, at least one processor 1020 communicatively coupled to the display, and at least one memory 1024 communicatively coupled to the processor. A coder 1032, which may be an encoder, decoder, or both, also may be provided. As an encoder 1032 and antenna 1034 may be provided to compress the modified image date for transmission to other devices that may display or store the image. It will be understood that the image processing system 1000 also may include a decoder (or encoder 1032 may include a decoder) to receive and decode image data for processing by the system 1000. Otherwise, the processed image 1030 may be displayed on display 1028 or stored in memory 1024. As illustrated, any of these components may be capable of communication with one another and/or communication with portions of logic modules 1004 and/or imaging device 1002. Thus, processors 1020 may be communicatively coupled to both the image device 1002 and the logic modules 1004 for operating those components. By one approach, although image processing system 1000, as shown in FIG. 10, may include one particular set of blocks or actions associated with particular components or modules, these blocks or actions may be associated with different components or modules than the particular component or module illustrated here.

Figure 11:
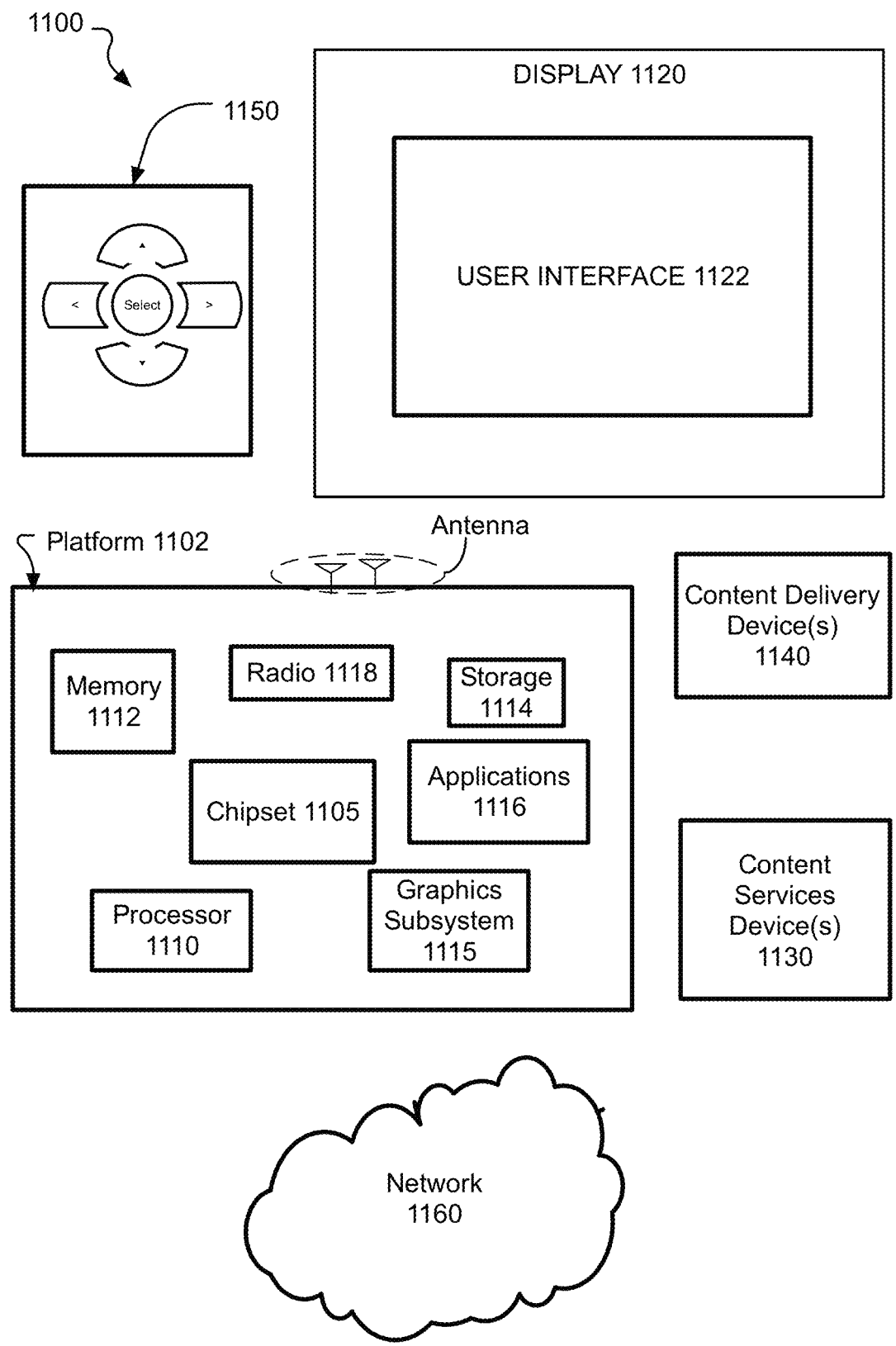
FIG. 11 is an illustrative diagram of another example system.

Referring to FIG. 11, an example system 1100 in accordance with the present disclosure operates one or more aspects of the image processing system described herein. It will be understood from the nature of the system components described below that such components may be associated with, or used to operate, certain part or parts of the image processing system 1000 described above. In various implementations, system 1100 may be a media system although system 1100 is not limited to this context. For example, system 1100 may be incorporated into a digital still camera, digital video camera, mobile device with camera or video functions such as an imaging phone, webcam, personal computer (PC), laptop computer, ultra-laptop computer, tablet with multiple cameras, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In various implementations, system 1100 includes a platform 1102 coupled to a display 1120. Platform 1102 may receive content from a content device such as content services device(s) 1130 or content delivery device(s) 1140 or other similar content sources. A navigation controller 1150 including one or more navigation features may be used to interact with, for example, platform 1102 and/or display 1120. Each of these components is described in greater detail below.

In various implementations, platform 1102 may include any combination of a chipset 1105, processor 1110, memory 1112, storage 1114, graphics subsystem 1115, applications 1116 and/or radio 1118. Chipset 1105 may provide intercommunication among processor 1110, memory 1112, storage 1114, graphics subsystem 1115, applications 1116 and/or radio 1118. For example, chipset 1105 may include a storage adapter (not depicted) capable of providing intercommunication with storage 1114.

Processor 1110 may be implemented as a Complex Instruction Set Computer (CISC) or Reduced Instruction Set Computer (RISC) processors; x86 instruction set compatible processors, multi-core, or any other microprocessor or central processing unit (CPU). In various implementations, processor 1110 may be dual-core processor(s), dual-core mobile processor(s), and so forth.

Memory 1112 may be implemented as a volatile memory device such as, but not limited to, a Random Access Memory (RAM), Dynamic Random Access Memory (DRAM), or Static RAM (SRAM).

Storage 1114 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1114 may include technology to increase the storage performance enhanced protection for valuable digital media when multiple hard drives are included, for example.

Graphics subsystem 1115 may perform processing of images such as still or video for display. Graphics subsystem 1115 may be a graphics processing unit (GPU) or a visual processing unit (VPU), for example. An analog or digital interface may be used to communicatively couple graphics subsystem 1115 and display 1120. For example, the interface may be any of a High-Definition Multimedia Interface, Display Port, wireless HDMI, and/or wireless HD compliant techniques. Graphics subsystem 1115 may be integrated into processor 1110 or chipset 1105. In some implementations, graphics subsystem 1115 may be a stand-alone card communicatively coupled to chipset 1105.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further implementations, the functions may be implemented in a consumer electronics device.

Radio 1118 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1118 may operate in accordance with one or more applicable standards in any version.

In various implementations, display 1120 may include any television type monitor or display. Display 1120 may include, for example, a computer display screen, touch screen display, video monitor, television-like device, and/or a television. Display 1120 may be digital and/or analog. In various implementations, display 1120 may be a holographic display. Also, display 1120 may be a transparent surface that may receive a visual projection. Such projections may convey various forms of information, images, and/or objects. For example, such projections may be a visual overlay for a mobile augmented reality (MAR) application. Under the control of one or more software applications 1116, platform 1102 may display user interface 1122 on display 1120.

In various implementations, content services device(s) 1130 may be hosted by any national, international and/or independent service and thus accessible to platform 1102 via the Internet, for example. Content services device(s) 1130 may be coupled to platform 1102 and/or to display 1120. Platform 1102 and/or content services device(s) 1130 may be coupled to a network 1160 to communicate (e.g., send and/or receive) media information to and from network 1160. Content delivery device(s) 1140 also may be coupled to platform 1102 and/or to display 1120.

In various implementations, content services device(s) 1130 may include a cable television box, personal computer, network, telephone, Internet enabled devices or appliance capable of delivering digital information and/or content, and any other similar device capable of unidirectionally or bidirectionally communicating content between content providers and platform 1102 and/display 1120, via network 1160 or directly. It will be appreciated that the content may be communicated unidirectionally and/or bidirectionally to and from any one of the components in system 1100 and a content provider via network 1160. Examples of content may include any media information including, for example, video, music, medical and gaming information, and so forth.

Content services device(s) 1130 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1102 may receive control signals from navigation controller 1150 having one or more navigation features. The navigation features of controller 1150 may be used to interact with user interface 1122, for example. In implementations, navigation controller 1150 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 1150 may be replicated on a display (e.g., display 1120) by movements of a pointer, cursor, focus ring, or other visual indicators displayed on the display. For example, under the control of software applications 1116, the navigation features located on navigation controller 1150 may be mapped to virtual navigation features displayed on user interface 1122, for example. In implementations, controller 1150 may not be a separate component but may be integrated into platform 1102 and/or display 1120. The present disclosure, however, is not limited to the elements or in the context shown or described herein.

In various implementations, drivers (not shown) may include technology to enable users to instantly turn on and off platform 1102 like a television with the touch of a button after initial boot-up, when enabled, for example. Program logic may allow platform 1102 to stream content to media adaptors or other content services device(s) 1130 or content delivery device(s) 1140 even when the platform is turned "off." In addition, chipset 1105 may include hardware and/or software support for 8.1 surround sound audio and/or high definition (7.1) surround sound audio, for example. Drivers may include a graphics driver for integrated graphics platforms. In implementations, the graphics driver may comprise a peripheral component interconnect (PCI) Express graphics card.

In various implementations, any one or more of the components shown in system 1100 may be integrated. For example, platform 1102 and content services device(s) 1130 may be integrated, or platform 1102 and content delivery device(s) 1140 may be integrated, or platform 1102, content services device(s) 1130, and content delivery device(s) 1140 may be integrated, for example. In various implementations, platform 1102 and display 1120 may be an integrated unit. Display 1120 and content service device(s) 1130 may be integrated, or display 1120 and content delivery device(s) 1140 may be integrated, for example. These examples are not meant to limit the present disclosure.

In various implementations, system 1100 may be implemented as a wireless system, a wired system, or a combination of both. When implemented as a wireless system, system 1100 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1100 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1102 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The implementations, however, are not limited to the elements or in the context shown or described in FIG. 11.

Figure 12:
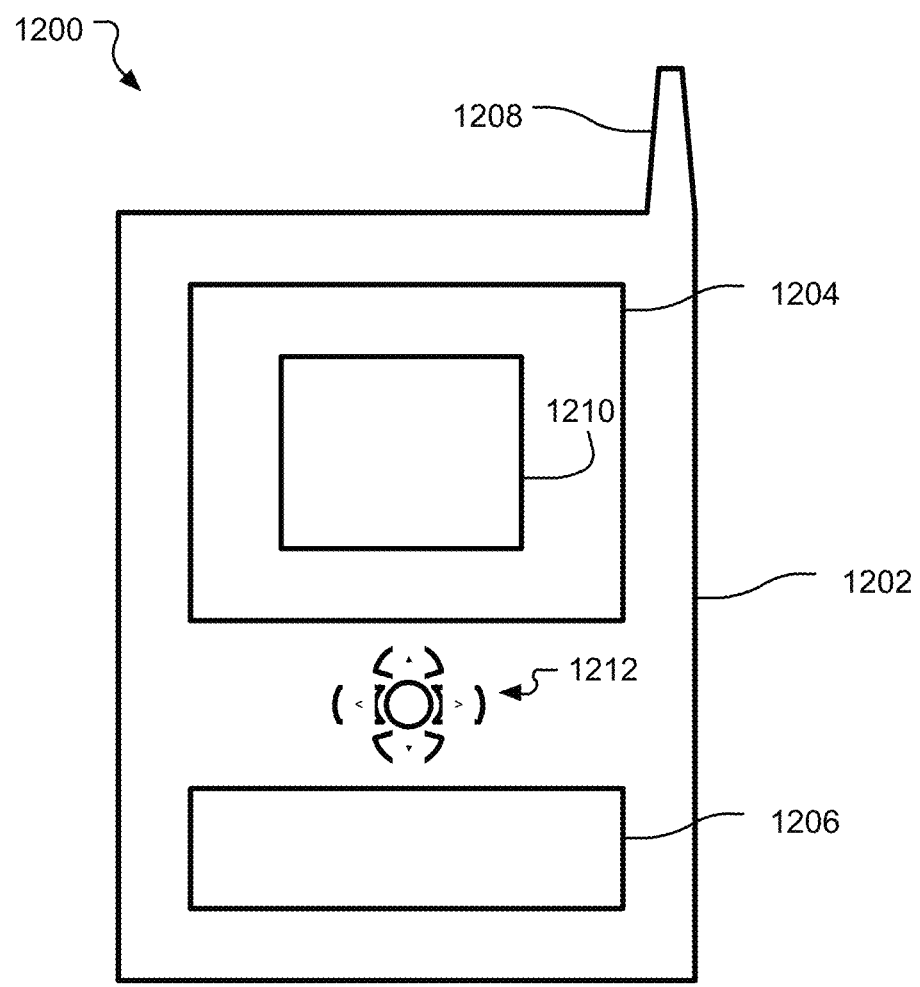
FIG. 12 illustrates another example device, all arranged in accordance with at least some implementations of the present disclosure.

Referring to FIG. 12, a small form factor device 1200 is one example of the varying physical styles or form factors in which system 1000 and/or 1100 may be embodied. By this approach, device 1200 may be implemented as a mobile computing device having wireless capabilities and multiple cameras. A mobile computing device may refer to any device having a processing system and a mobile power source or supply, such as one or more batteries, for example.

As described above, examples of a mobile computing device may include a digital still camera, digital video camera, mobile devices with camera or video functions such as imaging phones, webcam, personal computer (PC), laptop computer, ultra-laptop computer, tablet with or without multiple cameras, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various implementations, for example, a mobile computing device may be implemented as a smart phone capable of executing computer applications, as well as voice communications and/or data communications. Although some implementations may be described with a mobile computing device implemented as a smart phone by way of example, it may be appreciated that other implementations may be implemented using other wireless mobile computing devices as well. The implementations are not limited in this context.

As shown in FIG. 12, device 1200 may include a housing 1202, a display 1204 including a screen 1210, an input/output (I/O) device 1206, and an antenna 1208. Device 1200 also may include navigation features 1212. Display 1204 may include any suitable display unit for displaying information appropriate for a mobile computing device. I/O device 1206 may include any suitable I/O device for entering information into a mobile computing device. Examples for I/O device 1206 may include an alphanumeric keyboard, a numeric keypad, a touch pad, input keys, buttons, switches, rocker switches, microphones, speakers, voice recognition device and software, and so forth. Information also may be entered into device 1200 by way of microphone (not shown). Such information may be digitized by a voice recognition device (not shown). The implementations are not limited in this context.

Various forms of the devices and processes described herein may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an implementation is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one implementation may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further implementations.

By one example implementation, a computer-implemented method of planar surface detection for image processing comprises obtaining depth image data having three dimensional coordinates for multiple pixels wherein each pixel forms a point in a depth image; selecting sample points in the depth image; generating a plane hypothesis for each one of multiple individual sample points by using multiple points; and performing voting to determine which pixels have content on the image that is likely to exist on at least one of the plane hypotheses.

By another implementation, this method may comprise that selecting the sample points comprises selecting sample points that are spaced from each other on the image, with uniform spacing from sample point to sample point, and that are spaced to form a horizontal and vertical array throughout an entire image; wherein the sample points are approximately 5 to 25 pixels apart from each other; wherein the spacing of the sample points from each other is selected based on, at least in part, at least one of: a minimum depth a camera providing the image can sense, an average depth detected in the image, and a focal length of the camera forming the image. The method also may include wherein the spacing of the sample points from each other is selected based on which application is to use the plane hypothesis to augment the image; with the method comprising: determining the plane hypotheses without testing a range of possible values for the parameters (a, b, c, d) in the planar equation expression ax+by+cz+d for a single image point to determine the values of (a, b, c, d); and determining the normal of a plane using three sample points to determine the plane hypothesis for one of the three sample points. Voting comprises, at least in part, comparing a normal of a plane hypothesis to a local area normal of a point on the image to determine whether the point is on the plane hypothesis, wherein the point is located at either (1) at or near a corner of a local area used to determine the local area normal or (2) at or near a center of the local area.

By a further implementation, a computer-implemented system of planar surface detection for image processing comprises at least one display; at least one memory, at least one processor communicatively coupled to the display and the memory; and a planar surface detection unit operated by the processor and to: obtain depth image data having three dimensional coordinates for multiple pixels wherein each pixel forms a point in a depth image; select sample points in the depth image; generate a plane hypothesis for each one of multiple individual sample points by using multiple points; and perform voting to determine which pixels have content on the image that is likely to exist on at least one of the plane hypotheses.

The system may also include that the planar surface detection unit is arranged to select a spacing of the sample points from each other based on, at least in part, at least one of: a minimum depth a camera providing the image can sense, an average depth detected in the image, and a focal length of the camera forming the image; wherein the planar surface detection unit is arranged to determine the plane hypotheses without testing a range of possible values for the parameters (a, b, c, d) in the planar equation expression ax+by+cz+d for a single image point to determine the values of (a, b, c, d); and wherein the planar surface detection unit is arranged to eliminate at least one plane hypothesis depending on a desired orientation of a plane being sought, wherein the planar surface detection unit is arranged to sense a gravitational direction, and eliminate at least one plane hypothesis depending on an orientation of the plane hypothesis relative to the gravitational direction. The system may also include that the planar surface detection unit is arranged to eliminate at least one plane hypothesis that overlaps another plane hypothesis, wherein the planar surface detection unit is arranged to eliminate the smaller plane hypothesis of two or more overlapping plane hypotheses; wherein the planar surface detection unit is arranged to: form plane indices listing one or more pixels assigned to a plane hypothesis; and change the plane index of at least one pixel to the plane index of other pixels near the one pixel based on region erosion and growth of the plane hypotheses.

As another implementation, a computer-readable medium having stored thereon instructions that when executed cause a computing device to: obtain depth image data having three dimensional coordinates for multiple pixels wherein each pixel forms a point in a depth image; select sample points in the depth image; generate a plane hypothesis for each one of multiple individual sample points by using multiple points; and perform voting to determine which pixels have content on the image that is likely to exist on at least one of the plane hypotheses.

As another option, the instructions execute the computing device to: select the sample points comprises selecting sample points that are spaced from each other on the image, with uniform spacing from sample point to sample point, and that are spaced to form a horizontal and vertical array throughout an entire image; wherein the sample points are approximately 5 to 25 pixels apart from each other; wherein the spacing of the sample points from each other is selected based on, at least in part, at least one of: a minimum depth a camera providing the image can sense, an average depth detected in the image, and a focal length of the camera forming the image. The instructions also may cause the computing device to include wherein the spacing of the sample points from each other is selected based on which application is to use the plane hypothesis to augment the image; with the instructions causing the computing device to: determine the plane hypotheses without testing a range of possible values for the parameters (a, b, c, d) in the planar equation expression ax+by+cz+d for a single image point to determine the values of (a, b, c, d); and determine the normal of a plane using three sample points to determine the plane hypothesis for one of the three sample points. The instructions also may cause the computing device to vote by comprising, at least in part, comparing a normal of a plane hypothesis to a local area normal of a point on the image to determine whether the point is on the plane hypothesis, wherein the point is located at either (1) at or near a corner of a local area used to determine the local area normal or (2) at or near a center of the local area.

In a further example, at least one machine readable medium may include a plurality of instructions that in response to being executed on a computing device, causes the computing device to perform the method according to any one of the above examples.

In a still further example, an apparatus may include means for performing the methods according to any one of the above examples.

The above examples may include specific combination of features. However, the above examples are not limited in this regard and, in various implementations, the above examples may include undertaking only a subset of such features, undertaking a different order of such features, undertaking a different combination of such features, and/or undertaking additional features than those features explicitly listed. For example, all features described with respect to any example methods herein may be implemented with respect to any example apparatus, example systems, and/or example articles, and vice versa.

What is claimed is:

1. A computer-implemented method of planar surface detection for image processing, comprising:
    obtaining depth image data having three dimensional coordinates for multiple pixels wherein each pixel forms a point in a depth image;
    selecting sample points in the depth image;
    generating a plane hypothesis to match a planar surface of an object in one or more images regardless of the direction the planar surface extends within the depth image, wherein the one or more images being used to form the depth image data, and the plane hypothesis being provided for each one of multiple individual sample points by using multiple points to generate the individual plane hypotheses; and
    performing voting to determine which pixels have content on the image that is likely to exist on at least one of the plane hypotheses.

2. The method of claim 1 wherein selecting the sample points comprises selecting sample points that are spaced from each other on the image.

3. The method of claim 1 wherein selecting the sample points comprises selecting sample points with uniform spacing from sample point to sample point.

4. The method of claim 1 wherein selecting the sample points comprises selecting sample points that are spaced to form a horizontal and vertical array throughout an entire image.

5. The method of claim 1 wherein the sample points are approximately 5 to 25 pixels apart from each other.

6. The method of claim 1 wherein the spacing of the sample points from each other is selected based on, at least in part, the minimum depth a camera providing the image can sense.

7. The method of claim 1 wherein the spacing of the sample points from each other is selected based on, at least in part, the average depth detected in the image.

8. The method of claim 1 wherein the spacing of the sample points from each other is selected based on, at least in part, the focal length of the camera forming the image.

9. The method of claim 1 wherein the spacing of the sample points from each other is selected based on which application is to use the plane hypothesis to augment the image.

10. The method of claim 1 comprising determining the plane hypotheses without testing a range of possible values for the parameters (a, b, c, d) in the planar equation expression ax+by+cz+d for a single image point to determine the values of (a, b, c, d).

11. The method of claim 1 comprising determining the normal of a plane using three sample points to determine the plane hypothesis for one of the three sample points.

12. The method of claim 1 wherein voting comprises, at least in part, comparing a normal of a plane hypothesis to a local area normal of a point on the image to determine whether the point is on the plane hypothesis.

13. The method of claim 12 wherein the point is located at either (1) at or near a corner of a local area used to determine the local area normal or (2) at or near a center of the local area.

14. The method of claim 1 wherein selecting the sample points comprises selecting sample points that are spaced from each other on the image, with uniform spacing from sample point to sample point, and that are spaced to form a horizontal and vertical array throughout an entire image;
  wherein the sample points are approximately 5 to 25 pixels apart from each other;
  wherein the spacing of the sample points from each other is selected based on, at least in part, at least one of:
    a minimum depth a camera providing the image can sense,
    an average depth detected in the image, and
    a focal length of the camera forming the image;
  wherein the spacing of the sample points from each other is selected based on which application is to use the plane hypothesis to augment the image;
  the method comprising:
    determining the plane hypotheses without testing a range of possible values for the parameters (a, b, c, d) in the planar equation expression ax+by+cz+d for a single image point to determine the values of (a, b, c, d);
    determining the normal of a plane using three sample points to determine the plane hypothesis for one of the three sample points;
  wherein voting comprises, at least in part, comparing a normal of a plane hypothesis to a local area normal of a point on the image to determine whether the point is on the plane hypothesis, wherein the point is located at either (1) at or near a corner of a local area used to determine the local area normal or (2) at or near a center of the local area.

15. A computer-implemented system of feature matching for multiple images, comprising:
  at least one display;
  at least one memory
  at least one processor communicatively coupled to the display and the memory;
  a planar surface detection unit operated by the at least one processor and to:
    obtain depth image data having three dimensional coordinates for multiple pixels wherein each pixel forms a point in a depth image;
    select sample points in the depth image;
    generate a plane hypothesis matching a planar surface of an object of at least one image used to form the depth image data and regardless of the direction the planar surface extends within the depth image, and a plane hypothesis being provided for each one of multiple individual sample points by using multiple points to form the individual plane hypotheses; and
    perform voting to determine which pixels have content on the image that is likely to exist on at least one of the plane hypotheses.

16. The system of claim 15 wherein the planar surface detection unit is arranged to select a spacing of the sample points from each other based on, at least in part, at least one of:
  a minimum depth a camera providing the image can sense,
  an average depth detected in the image, and
  the focal length of the camera forming the image.

17. The method of claim 15 wherein the planar surface detection unit is arranged to determine the plane hypotheses without testing a range of possible values for the parameters (a, b, c, d) in the planar equation expression ax+by+cz+d for a single image point to determine the values of (a, b, c, d).

18. The system of claim 15 wherein the planar surface detection unit is arranged to eliminate at least one plane hypothesis depending on a desired orientation of a plane being sought.

19. The system of claim 15 wherein the planar surface detection unit is arranged to sense a gravitational direction; and eliminate at least one plane hypothesis depending on an orientation of the plane hypothesis relative to the gravitational direction.

20. The system of claim 15 wherein the planar surface detection unit is arranged to eliminate at least one plane hypothesis that overlaps another plane hypothesis.

21. The system of claim 20 wherein the planar surface detection unit is arranged to eliminate the smaller plane hypothesis of two or more overlapping plane hypotheses.

22. The system of claim 15 wherein the planar surface detection unit is arranged to form plane indices listing one or more pixels assigned to a plane hypothesis; and
  change the plane index of at least one pixel to the plane index of other pixels near the one pixel based on region erosion and growth of the plane hypotheses.

23. The system of claim 15 wherein the planar surface detection unit is arranged to select a spacing of the sample points from each other based on, at least in part, at least one of:
  a minimum depth a camera providing the image can sense,
  an average depth detected in the image, and a focal length of the camera forming the image;

wherein the planar surface detection unit is arranged to determine the plane hypotheses without testing a range of possible values for the parameters (a, b, c, d) in the planar equation expression ax+by +cz+d for a single image point to determine the values of (a, b, c, d);

wherein the planar surface detection unit is arranged to eliminate at least one plane hypothesis depending on a desired orientation of a plane being sought, wherein the planar surface detection unit is arranged to sense a gravitational direction, and eliminate at least one plane hypothesis depending on an orientation of the plane hypothesis relative to the gravitational direction;

wherein the planar surface detection unit is arranged to eliminate at least one plane hypothesis that overlaps another plane hypothesis, wherein the planar surface detection unit is arranged to eliminate the smaller plane hypothesis of two or more overlapping plane hypotheses;

wherein the planar surface detection unit is arranged to:

form plane indices listing one or more pixels assigned to a plane hypothesis; and change the plane index of at least one pixel to the plane index of other pixels near the one pixel based on region erosion and growth of the plane hypotheses.

24. A non-transitory computer-readable medium having stored thereon instructions that when executed cause a computing device to: obtain depth image data having three dimensional coordinates for multiple pixels wherein each pixel forms a point in a depth image; select sample points in the depth image; generate a plane hypothesis matching a planar surface of an object of at least one image used to form the depth image data and regardless of the direction the planar surface extends within the depth image, and a plane hypothesis being provided for each one of multiple individual sample points by using multiple points to form the individual plane hypotheses; and perform voting to determine which pixels have content on the image that is likely to exist on at least one of the plane hypotheses.

25. The non-transitory computer-readable medium of claim 24 wherein selecting the sample points comprises selecting sample points that are spaced from each other on the image, with uniform spacing from sample point to sample point, and that are spaced to form a horizontal and vertical array throughout an entire image; wherein the sample points are approximately 5 to 25 pixels apart from each other; wherein the spacing of the sample points from each other is selected based on, at least in part, at least one of: a minimum depth a camera providing the image can sense, an average depth detected in the image, and a focal length of the camera forming the image; wherein the spacing of the sample points from each other is selected based on which application is to use the plane hypothesis to augment the image; the instructions causing the computing device to: determine the plane hypotheses without testing a range of possible values for the parameters (a, b, c, d) in the planar equation expression ax+by +cz+d for a single image point to determine the values of (a, b, c, d); determine the normal of a plane using three sample points to determine the plane hypothesis for one of the three sample points; wherein voting comprises, at least in part, comparing a normal of a plane hypothesis to a local area normal of a point on the image to determine whether the point is on the plane hypothesis, wherein the point is located at either (1) at or near a corner of a local area used to determine the local area normal or (2) at or near a center of the local area.

* * * * *